(12) United States Patent
Powell et al.

(10) Patent No.: US 6,354,492 B1
(45) Date of Patent: Mar. 12, 2002

(54) SYSTEM AND METHOD EMPLOYING A PORTABLE CARD TO CONFIGURE A STORE FOR PRODUCT PROMOTION

(75) Inventors: Ken R. Powell, Athens; Eleanor B. Maxwell, Crawford, both of GA (US); Corey C. Snook, Meredith, NH (US)

(73) Assignee: SoftCard Systems, Inc., Watkinsville, GA (US)

( * ) Notice: Subject to any disclaimer, the term of this patent is extended or adjusted under 35 U.S.C. 154(b) by 0 days.

(21) Appl. No.: 09/301,747

(22) Filed: Apr. 29, 1999

(51) Int. Cl.[7] .................................................. G06K 5/00

(52) U.S. Cl. ....................... 235/380; 235/383; 235/381; 705/14

(58) Field of Search ................................ 235/493, 360, 235/375, 376, 379, 487, 486, 381, 385; 902/27; 705/14, 40–45

(56) References Cited

U.S. PATENT DOCUMENTS

| | | | |
|---|---|---|---|
| 5,500,517 A | | 3/1996 | Cagliostro |
| 5,619,558 A | * | 4/1997 | Jheeta .......................... 379/90 |
| 5,727,153 A | | 3/1998 | Powell |
| 5,914,670 A | * | 6/1999 | Goodwin, III et al. . 340/825.52 |
| 6,024,288 A | * | 2/2000 | Gottlich et al. ............. 235/493 |

FOREIGN PATENT DOCUMENTS

| | | | |
|---|---|---|---|
| JP | 03202991 A | * | 3/1991 |
| JP | 2000331201 A | * | 11/2000 |

* cited by examiner

*Primary Examiner*—Thien M. Le
(74) *Attorney, Agent, or Firm*—Jerome D. Jackson

(57) ABSTRACT

Disclosed are systems and methods employing a portable card to configure a commercial system. An exemplary system acts to read from the card at a first location in the store, to process a signal corresponding to a first promotion set stored on the card. The exemplary system also acts to read from the card at a second location in the store, to process a signal corresponding to a second promotion set stored on the card.

27 Claims, 29 Drawing Sheets

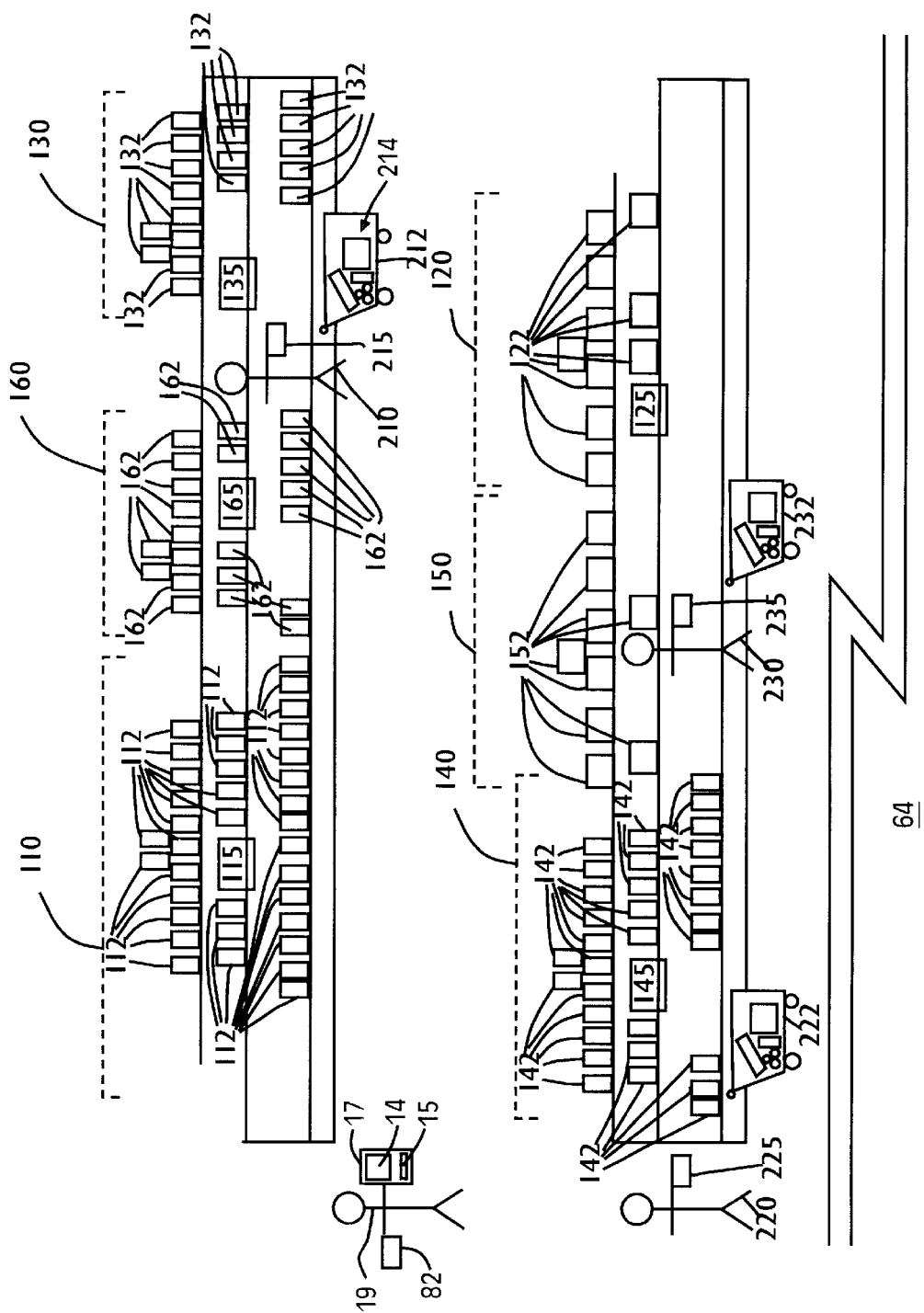

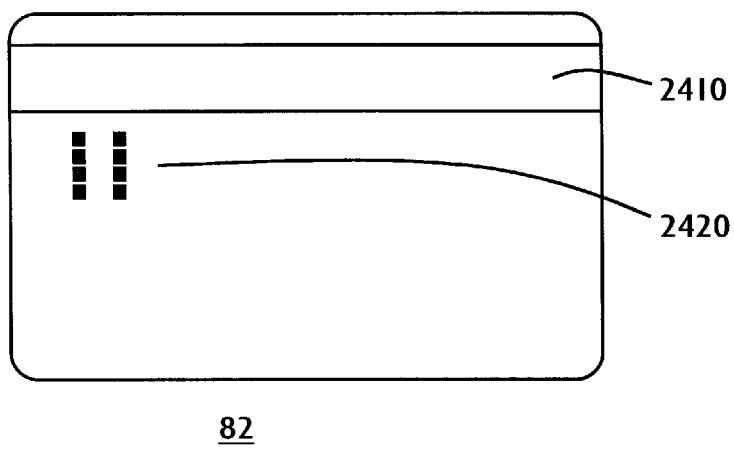
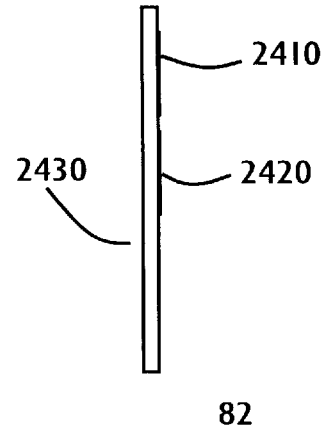
Fig. 7A    Fig. 7B
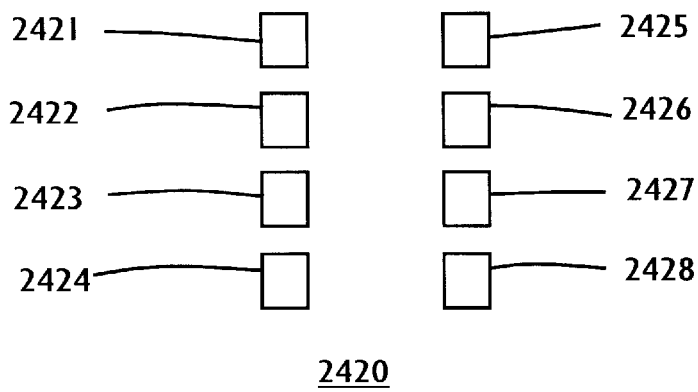
Fig. 7C 3656
3655
3654

8435

| | | | |
|---|---|---|---|
| 3655 | 01703149873 | 0 | 50 |
| 3654 | 01705424943 | 0 | 75 |
| 3656 | 01707542312 | 2 | 20 |

| | | |
|---|---|---|
| 01703149873 | 0 | 50 |
| 01705424943 | 0 | 75 |
| 01707542312 | 2 | 20 |

| ADDRESS FOR FINANCIAL COMPUTER 40 | ID CODE FOR PRODUCT SERVER | 53, 0 17075 00003 3 (PRODUCT REQUEST MESSAGE, INCLUDING PRODUCT REQUEST CODE AND UPC PRODUCT CODE) |

| ADDRESS FOR REGISTER COMPUTER IN STATION 300 | | 63, 122, 278, "DELTA DETERGENT - 16 oz." (PRODUCT REPLY, INCLUDING PRODUCT REPLY CODE, PRICE, UPC COUPON FAMILY CODE, AND TEXT FOR DISPLAY OF PRODUCT DESCRIPTION) |

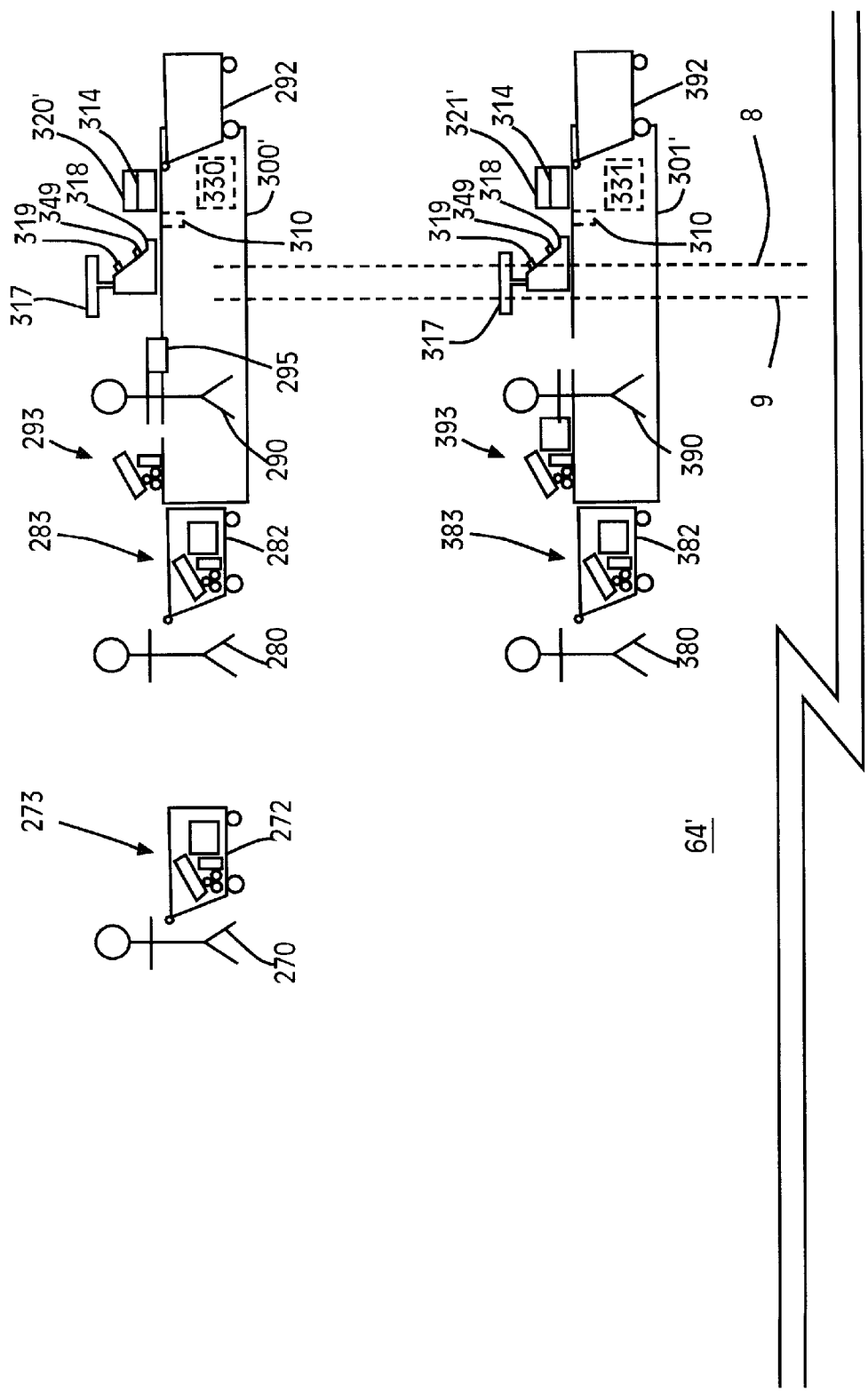

SYSTEM AND METHOD EMPLOYING A PORTABLE CARD TO CONFIGURE A STORE FOR PRODUCT PROMOTION

BACKGROUND OF THE INVENTION

1. Field of the Invention

This invention relates generally to a commercial system and, more particularly, to a system and method employing a portable card to configure a store for product promotions.

2. Description of Related Art

Product promotions employing price discounts are a popular means to stimulate sales of products such as grocery store items. One type of product promotion is a discount coupon. It has been estimated that in-store couponing coupled with advertising increases sales by 544%.

Product promotion discounts may change over time as certain promotions come into effect or expire. It is important to deploy product promotion discounts accurately, to avoid customer confusion and to limit the liability of the manufacturer or retailer sponsoring the promotion.

SUMMARY OF THE INVENTION

It is an object of the present invention to provide an improved system and method for deploying product promotion discounts.

To achieve this and other objects of the present invention, there is a method for a store and a portable card for storing a plurality of promotions. The method comprises reading from the card at a first location in the store, to process a signal corresponding to a first promotion set stored on the card; and reading from the card at a second location in the store, to process a signal corresponding to a second promotion set stored on the card.

According to another aspect of the present invention, there is a method for store and a portable card for storing a plurality of coupons. The method comprises the steps, performed in the store, of reading from the card at a first location in the store, to process a signal corresponding to a first coupon stored on the card; reading from the card at a second location in the store, to process a signal corresponding to a second coupon stored on the card; reading from the card at a third location in the store, to process the first and second coupons stored on the card; and determining an amount due in accordance with a coupon received by a customer in the store and a product selected by the customer.

According to yet another aspect of the present invention, there is a method for store and a portable card for storing a plurality of coupons. The method comprises the steps, performed in the store, of reading from the card at a first location in the store, to display a signal corresponding to a first product promotion stored on the card; reading from the card at a second location in the store, to display a signal corresponding to a second product promotion stored on the card; reading from the card at a third location in the store, to process the first and second product promotions stored on the card; and determining an amount due in accordance with a product promotion readable by a customer in the store and a product selected by the customer.

According to yet another aspect of the present invention, there is a system for a store and a portable card for storing a plurality of promotions. The system comprises a first receiver that receives signals from the card, to process a signal corresponding to a first promotion set stored on the card; a second receiver that receives signals from the card, to process a signal corresponding to a second promotion set stored on the card.

According to yet another aspect of the present invention, there is a system for a store and a portable card for storing a plurality of coupons. The system comprises a first receiver that receives signals from the card, to process a signal corresponding to a first coupon stored on the card; a second receiver that receives signals from the card, to process a signal corresponding to a second coupon stored on the card; a third receiver that receives signals from the card, to process the first and second coupons stored on the card; and a processor that determines an amount due in accordance with a coupon received by a customer in the store and the product selected by the customer.

According to yet another aspect of the present invention, there is a system for a store and a portable card for storing a plurality of coupons. The system comprises a first receiver that receives signals from the card, to display a signal corresponding to a first product promotion stored on the card; a second receiver that receives signals from the card, to display a signal corresponding to a second product promotion stored on the card; a third receiver that receives signals from the card, to process the first and second product promotions stored on the card; and a processor that determines an amount due in accordance with a product promotion readable by a customer in the store and a product selected by the customer.

According to yet another aspect of the present invention, there is a method of operating with a system including a portable card, a card writer, and a store including a plurality of shelves each having a respective interface supported by the shelf, the method comprises writing a plurality of first signals onto the card, each first signal corresponding to a promotion for a product in the store, and the steps, performed for each interface, of writing a second signal onto the card using the card writer; moving the card to the interface; receiving, in the interface, the second signal from the card; and processing, in the interface, a selected first signal from the card, the selected first signal being determined by the second signal.

BRIEF DESCRIPTION OF THE DRAWINGS

FIGS. 4A and 4B are another type of view of a part of the first preferred retail store.

FIG. 7A is a plan view of the program card shown in FIG. 4A.

FIG. 7B is a side view of the card shown in FIG. 7A.

FIG. 7C is an enlarged, partial view of the card shown in FIG. 7A.

FIG. 12 is a diagram of a table for controlling coupon processing during store checkout transactions.

FIG. 16 is a diagram of a message sent over a computer network in the second preferred system.

FIG. 17 is a diagram of another message sent over a computer network in the second preferred system.

FIGS. 22A and 22B are a view of another part of the second preferred retail store.

FIG. 27 is a diagram of a table for controlling discount processing in the second preferred system.

The accompanying drawings which are incorporated in and which constitute a part of this specification, illustrate embodiments of the invention and, together with the description, explain the principles of the invention, and additional advantages thereof. Throughout the drawings, corresponding elements are labeled with corresponding reference numbers.

DESCRIPTION OF THE PREFERRED EMBODIMENTS

Promotion Distribution in the First Preferred Embodiment

Figure 1:
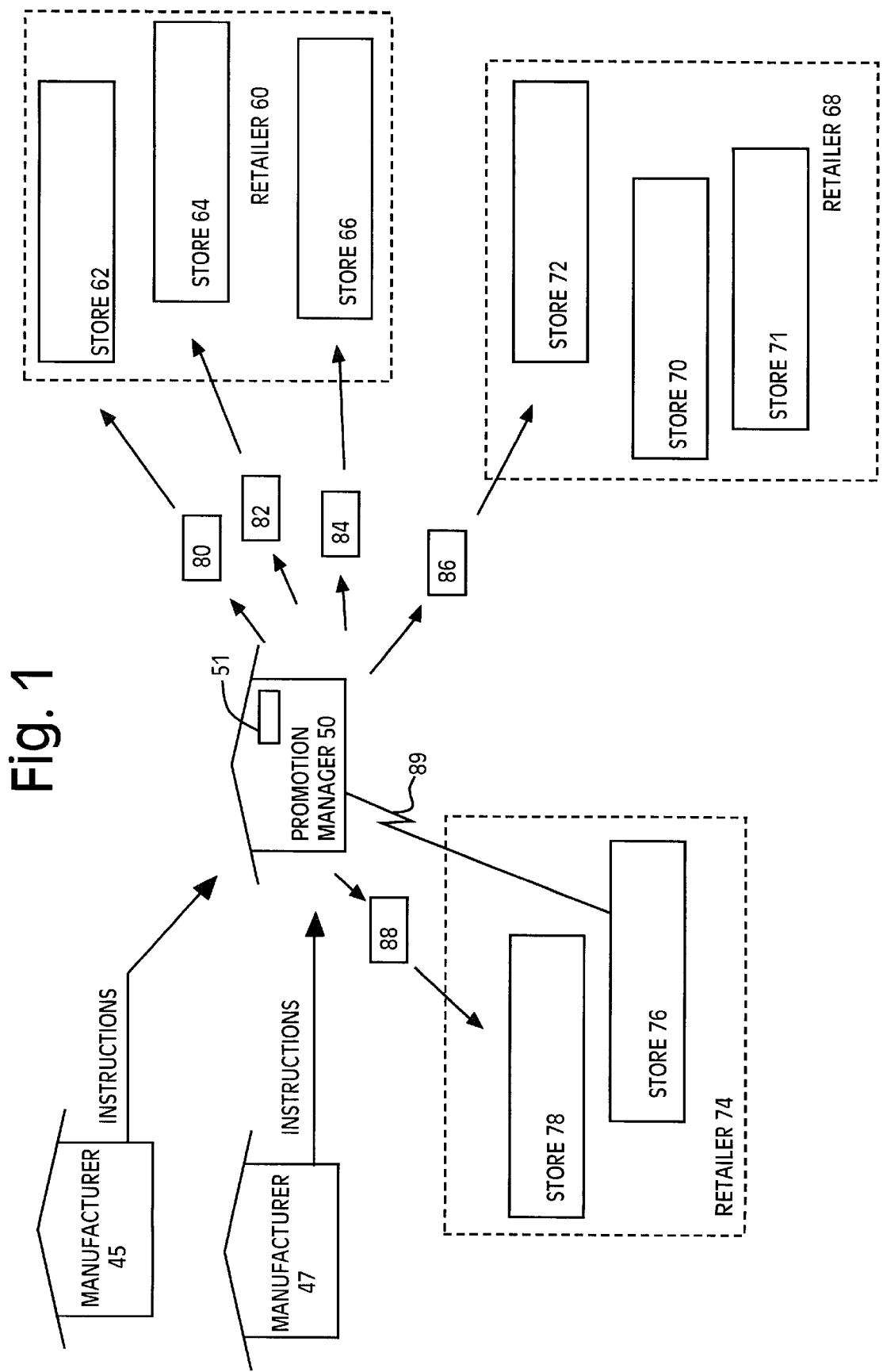
FIG. 1 is a diagram of a system in accordance with the first preferred embodiment of the present invention.

FIG. 1 shows a system of product promotion in accordance with a first preferred embodiment of the present invention. Manufacturer 45 is the Delta Company. The product line of the Delta Company includes Delta Brand Detergent. To stimulate sales, manufacturer 45 instructs promotion manager 50 to distribute discount coupon programs, from time to time.

Promotion manager 50 is located in Athens, Ga. Manager 50 receives instructions from multiple manufacturers, including manufacturers 45 and manufacturer 47. In response to instructions from manufacturers, manager 50 distributes promotion plans to various stores throughout a wide geographic area. Circuitry 51 in manager 50 writes a "flight" of promotion plans onto portable card 80. Manager 50 then sends card 80 to store 62. In this Patent Application, a "flight" is a set of promotions, wherein each promotion in the set comes into effect concurrently and may expire concurrently.

Manager 50 sends card 80 via a courier, such as the U.S. mail or a private package delivery service. Similarly manager 50 sends a flight of promotions to store 64 via card 82 and a courier, and manager 50 sends a flight of product promotions to store 66 via card 84 and a courier.

Retailer 60, depicted by a dotted contour in FIG. 1, is the ABC grocery store chain. Retailer 60 includes grocery stores 62, 64, and 66. Although stores 62, 64, and 66 are part of a common business unit, retailer 60, stores 62, 64, and 66 are widely separated geographically. Store 62 is in Tucson, Ariz.; store 64 is in Los Angeles Calif.,; and store 66 is in Honolulu, Hi.

Stores 70, 71, and 72 are part of retailer 68, which is a common business unit. Manager 50 sends a flight of promotions to retailer 68 via portable card 86 and a courier. Subsequently, a service worker carries card 86 to each of stores 72, 70, and 71 to configure each store with a respective set of product promotions.

Stores 76 and 78 are part of retailer 74, which is a common business unit. Manager 50 sends a flight of coupon promotions to store 78 via card 88 and a courier. Manager 50 sends a flight of coupons to store 76 via wide area communication line 89. Circuitry in store 76 receives the coupon flight from line 89 and writes the flight onto a portable card using a card writer in store 76. In this Patent Application, the word circuitry encompasses dedicated hardware, and/or programmable hardware, such as a CPU or reconfigurable logic array, in combination with programming data, such as sequentially fetched CPU instructions or programming data for a reconfigurable array.

Figure 2:
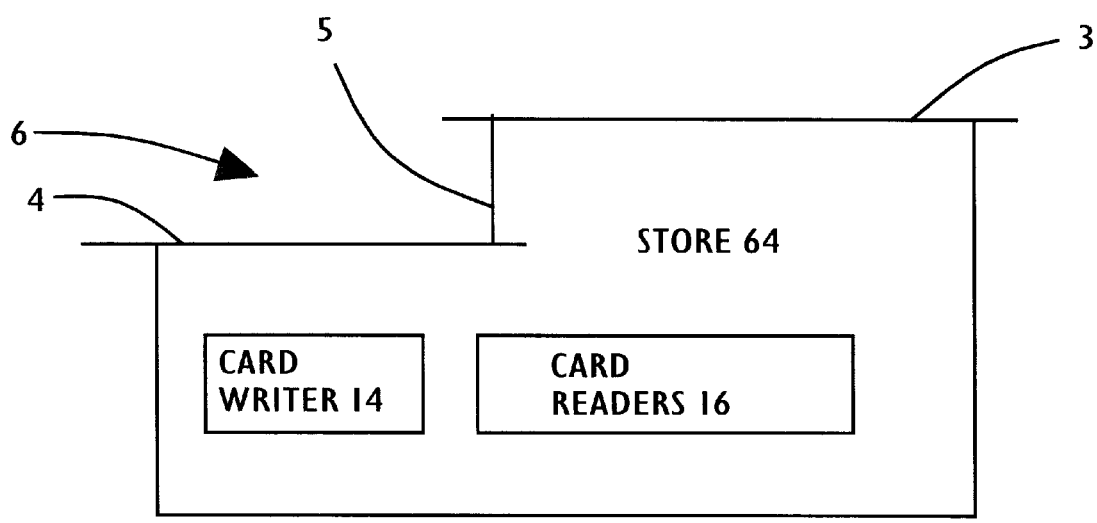
FIG. 2 is a view of a store in the system shown in FIG. 1.

FIG. 2 shows a store 64 including roof structure 6, card writer 14 under roof structure 6, and a plurality of card readers 16 under roof structure 6. Roof structure 6 includes roof section 4, window 5 coupled to roof section 4, and roof section 3 coupled to window 5.

Figure 3:
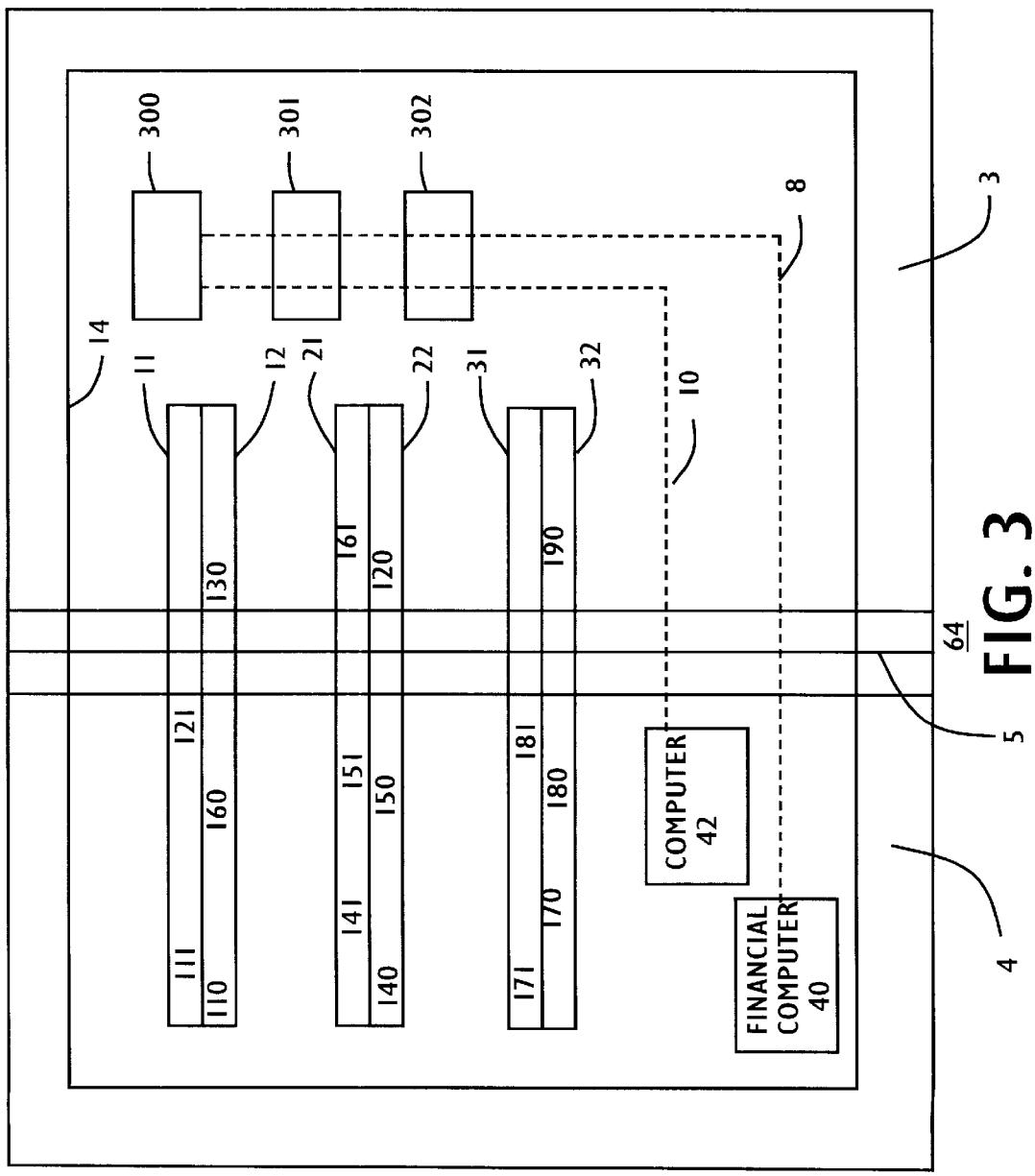
FIG. 3 is a plan view of the retail store in accordance with a first preferred embodiment.

FIG. 3 shows a plan view of store 64. Shelves 11, 12, 21, 22, 31, and 32 include product areas 111, 121, 110, 120, 130, 141, 151, 161, 140, 150, 160, 171, 181, 170, 180, and 190. Each product area includes a plurality of a respective product. Customers shop in store 64 by removing products from the shelves and bringing the products to one of the checkout stations 300, 301, or 302. Some computers in checkout stations 300, 301, 302 communicate with financial computer 40 via computer network cable 8. Other computers in checkout stations 300, 301, 302 communicate with computer 42 via computer network cable 10.

FIGS. 4A, 4B, 5A and 5B are each a partial view of 64. Customers 210, 220, 230, 240, 250, 270, 280, 290, 380, 390, 470, 480, and 490 shop in store 64. Store 64 has a plurality of product areas, each corresponding to a respective product. Product Area 110 has Delta brand detergent. Product Area 120 has Old World brand pasta. Product Area 130 has Lighthouse brand light bulbs.

Some of the product areas have a respective shelf unit for writing an electronic coupon onto a customer card. Product Area 110 has Shelf unit 115. Product Area 120 has Shelf unit 125. Product Area 130 has Shelf unit 135.

As shown in FIG. 4A, store clerk 19 carries card 82 for reprogramming shelf units 115, 125, and 135; and for reprogramming checkout stations 300, 301, and 302. Store clerk 19 also carries card writer 17, which is a portable device having card interface slot 15 and keypad 14.

To reprogram a particular shelf unit, clerk 19 inserts card 82 into interface slot 15 of card writer 17, and activates key pad 14 to cause card writer 17 to write promotion selection data onto card 82. Subsequently, clerk 19 presents card 82 to a shelf unit, allowing the shelf unit to read and process the promotion identified by the promotion selection data, as described in more detail below.

Product Area 110 has bottles of detergent 112 grouped together on multiple shelves. Bottles of detergent 112 are contiguously grouped, meaning that no other product is between any two bottles of detergent 112. No other product is between shelf unit 115 and bottles of detergent 112. Shelf unit 115 is on a shelf under some of the bottles 112 and over some of the bottles 112. In other words, Shelf unit 115 is adjacent to bottles 112 and supported by a shelf that is in vertical alignment with some of the bottles 112.

Figure 6A:
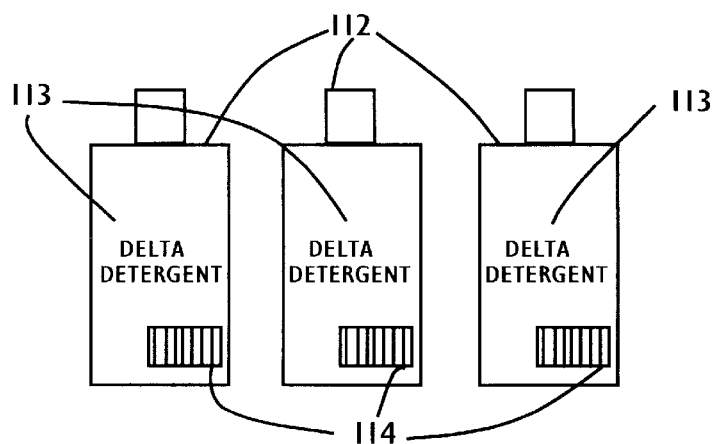
FIGS. 6A, 6B, and 6C are enlarged views of some products shown in FIGS. 4A and 4B.

FIG. 6A shows an enlarged view of some of the bottles of detergent 112. Each bottle of detergent has a common Universal Product Code (UPC) symbol 114. Symbol 114 encodes a 12-digit number that is part of a product identification system documented by the Uniform Code Council, Inc., Dayton, Ohio. In UPC Product Code format, the first digit is a 0, designating a product. The next five digits are a manufacturer ID. The next 5 digits are an item number. The last digit is a check digit.

Each UPC symbol 114 is a group of parallel lines that encodes a number (0 17075 00003 3) that uniquely identifies Delta Detergent. In other words, symbol 114 is different from UPC symbols of units of other products. Each bottle of detergent 112 also has a common character label 113 that verbally describes the product. Character label 113 is "DELTA DETERGENT." Label 113 is different from labels of units of other products.

Figure 6B:
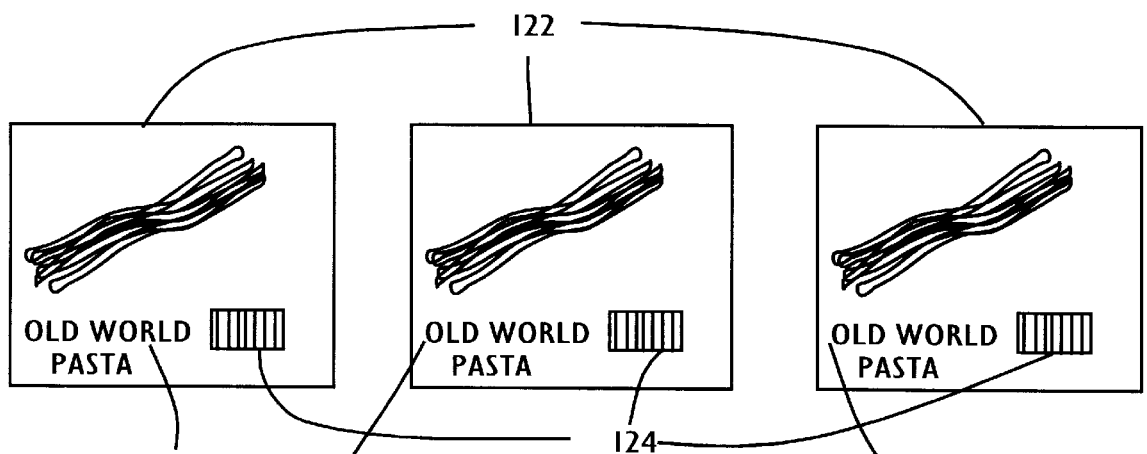

Product Area 120 has boxes of Old World brand pasta 122 contiguously grouped together on multiple shelves. FIG. 6B shows an enlarged view of some of the boxes of pasta 122. Each box of pasta 122 has a common UPC symbol 124, which is a group of parallel lines that encodes a number (0 17031 00005 3) that uniquely identifies Old World pasta. In other words, symbol 124 is different from UPC symbols of units of other products. Each box of pasta 122 also has a common character label 123 that verbally describes the product. Character label 123 is "OLD WORLD PASTA." Label 123 is different from labels of units of other products.

Figure 6C:
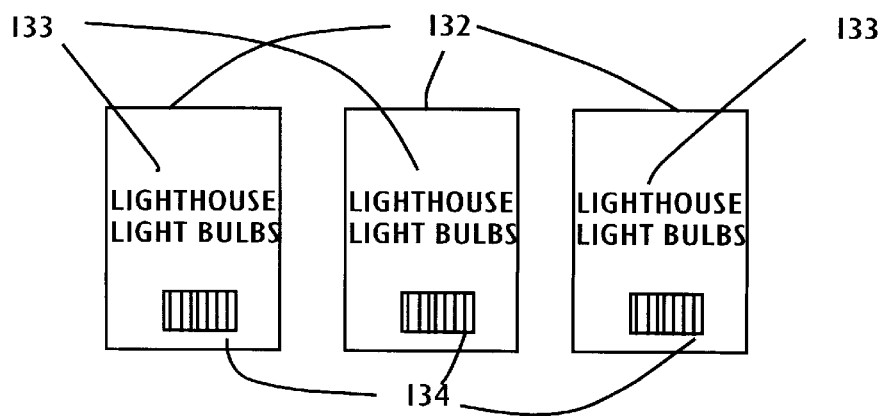

Product Area 130 has boxes of Lighthouse brand light bulbs 132 grouped together on multiple shelves. FIG. 6C shows an enlarged view of some of the boxes of light bulbs 132. Each box of light bulbs 132 has a common UPC symbol 134, which is a group of parallel lines that encode a number (0 17054 1017 6) that uniquely identifies Lighthouse light bulbs. In other words, symbol 134 is different from UPC symbols of other products. Each box 132 also has a common character label 133 that verbally describes the product. Character label 133 is "LIGHTHOUSE LIGHT BULBS." Label 133 is different from labels of other products.

Figure 4B:
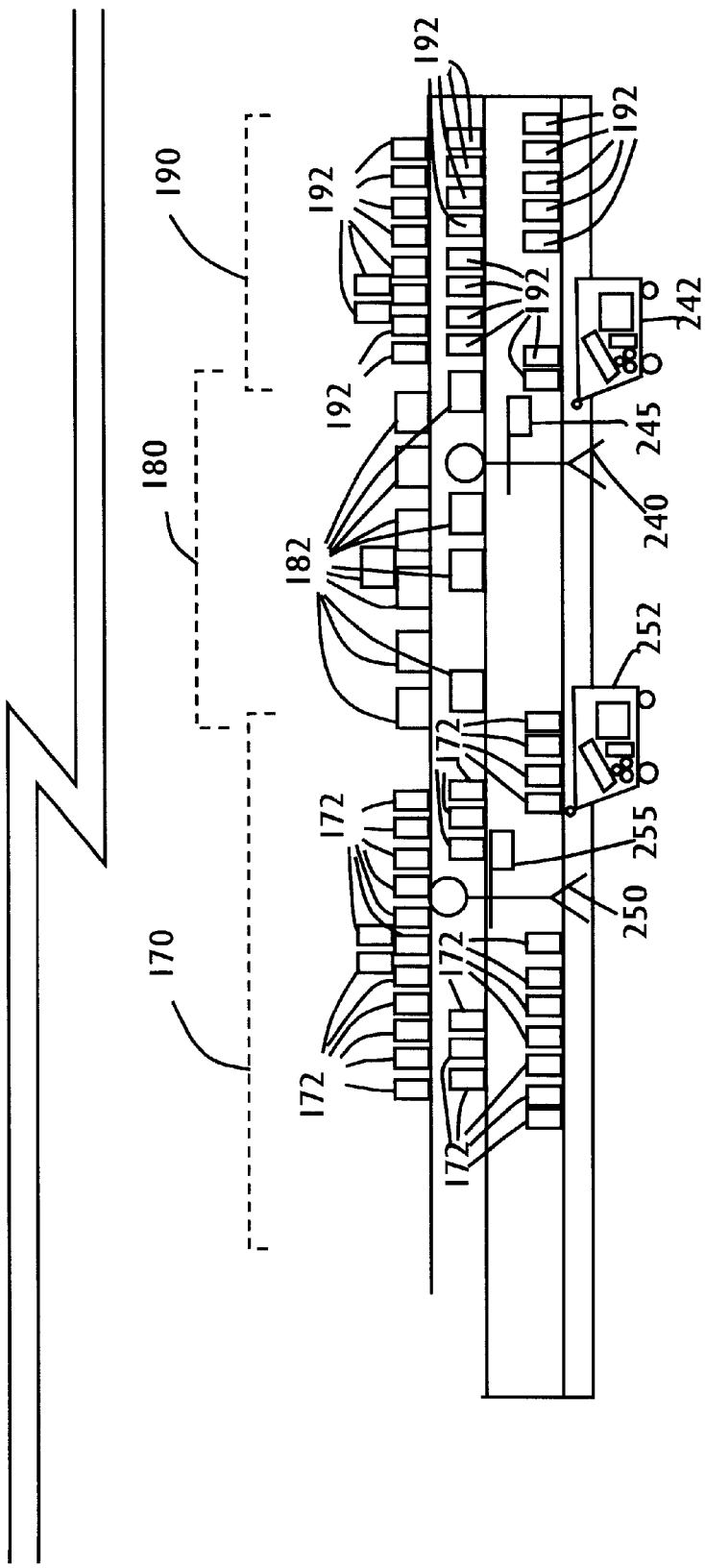

Similarly, other product areas have a set of respective products contiguously grouped together. Respective units of a certain product have a common UPC symbol, different from UPC symbols on units of other products, that uniquely identifies the certain product. Respective units of a certain product have a common label, different from labels on units of other products, that uniquely identifies the certain product. Referring to FIGS. 3, 4A, and 4B product area 140 has bottles of ABC brand ketchup 142 contiguously grouped together, and shelf unit 145. Product area 150 has boxes of Fido brand dog food 152 contiguously grouped together, and no shelf unit. Product area 160 has loaves of Boxer brand bread 162 contiguously grouped together, and shelf unit 165. Product area 170 has cartons of Clover brand milk 172 contiguously grouped together, and no shelf unit. Product area 180 has packages of Chicago brand bacon 182, and no shelf unit. Product area of 190 has packages of Clover brand butter 192 contiguously grouped together, and no shelf unit. Product area 111 has boxes of XYZ brand paper napkins contiguously grouped together. Product area 121 has rolls of XYZ brand paper towel contiguously grouped together. Product area 141 has boxes of Wheat brand crackers contiguously grouped together. Product area 151 has Tropical brand canned fruit contiguously grouped together. Product area 161 has V brand canned vegetables contiguously grouped together. Product area 171 has cans of Chicago brand meat contiguously grouped together. Product area 181 has boxes of Mill brand flour contiguously grouped together.

To receive an electronic coupon in the store, a customer inserts her respective card into the shelf unit adjacent to a product the customer wishes to purchase, and the shelf unit then writes an electronic coupon onto the card. In other words, the shelf unit writes an electronic coupon into a memory on the card, in response to a person presenting the card at the shelf unit.

The customer also removes the product from the shelf and places the removed product into her cart.

FIG. 7A shows a plan view of program card 82, sent by promotion manager 50 and carried by clerk 19. FIG. 7B shows a side view of card 82. Card 82 is 8.5 cm by 5.4 cm, the length and width of a typical financial credit card. Card 82 is slightly thicker than a typical financial credit card. Card 82 includes a magnetic stripe 2410, interface contacts 2420 for communication with the checkout station, and embossed area 2430 for displaying the card owner's name. Magnetic stripe 2410 allows a conventional credit card stripe reader to read basic data from the card. Magnetic stripe 2410 is not necessary to the operation of the preferred embodiment of the invention.

FIG. 7C shows interface contacts 2420 in more detail. Interface contacts 2420 are configured in accordance with ISO 7816-2: 1988(E), Identification cards—Integrated circuit (s) cards with contact—Part 2: Dimensions and locations of the contacts, promulgated by the International Organization for Standardization (ISO), and available from the American National Standards Institute (ANSI), 11 West 42nd Street, New York, N.Y. 10036. According to ISO 7816-2, contact 2421 is assigned to VCC (supply voltage), contact 2422 is assigned to RST (reset signal), contact 2423 is assigned to CLK (clock signal), contact 2424 is reserved for future use, contact 2425 is assigned to GND (ground), contact 2426 is assigned to VPP (programming voltage), contact 2427 is assigned to I/O (data input/output), and contact 2428 is reserved for future use. Card 82 communicates with the shelf units through contact 2427 using a half duplex scheme, meaning that contact 2427 is for communicating data signals either to or from the card.

Figures 8, 20:
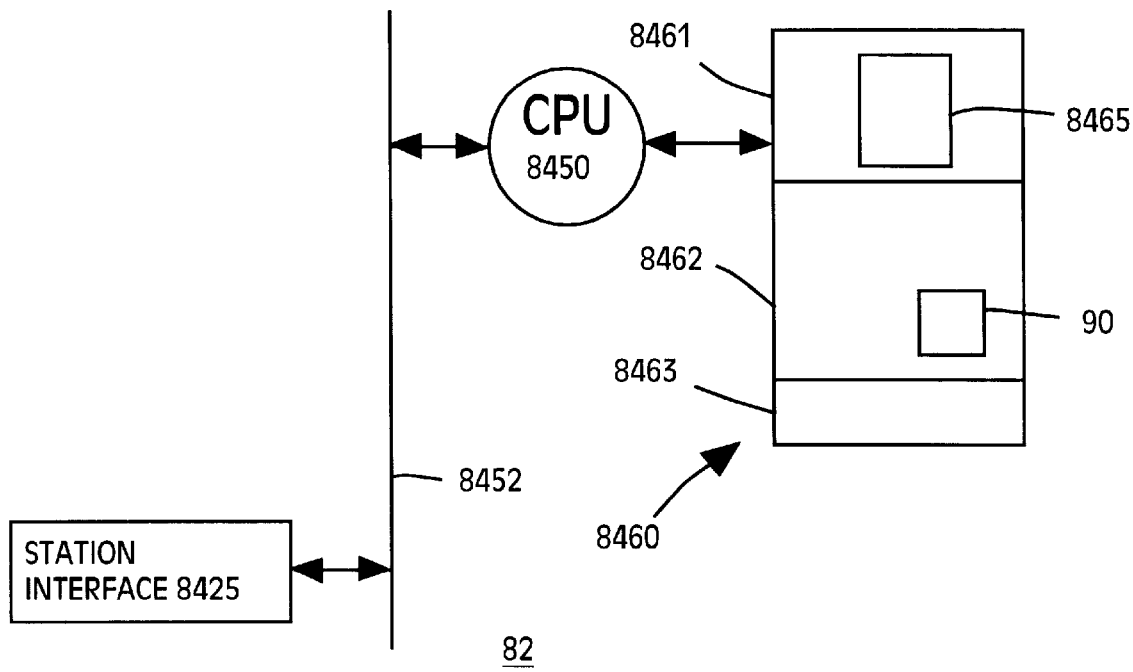
FIG. 8 is a block diagram of the program card.
FIG. 20 is a diagram of some memory contents of a customer card.

FIG. 8 is a block diagram of program card 82, including central processing unit (CPU) 8450, and memory 8460. Random access memory 8460 includes three addressable segments: nonvolatile read only memory (ROM) 8461; nonvolatile, electrically erasable memory (EEPROM) 8462; and memory 8463 for temporary storage. Station interface 8425 includes a serial to parallel converter for transferring data signals between contact 2427 and CPU 8450 over parallel bus 8452. ROM 8461 stores a program 8465 executed by CPU 8450.

Each of program cards 80, 84, 86, 87, and 88 has the same hardware structure as program card 82.

EEPROM 8462 also stores program card records 90 written by promotion manager 50. Records 90 include a plurality of product promotions. When clerk 19 inserts program card 82 into a shelf unit, the shelf unit reads and processes the promotion identified by the promotion selection data, written by card writer 14.

Figure 9:
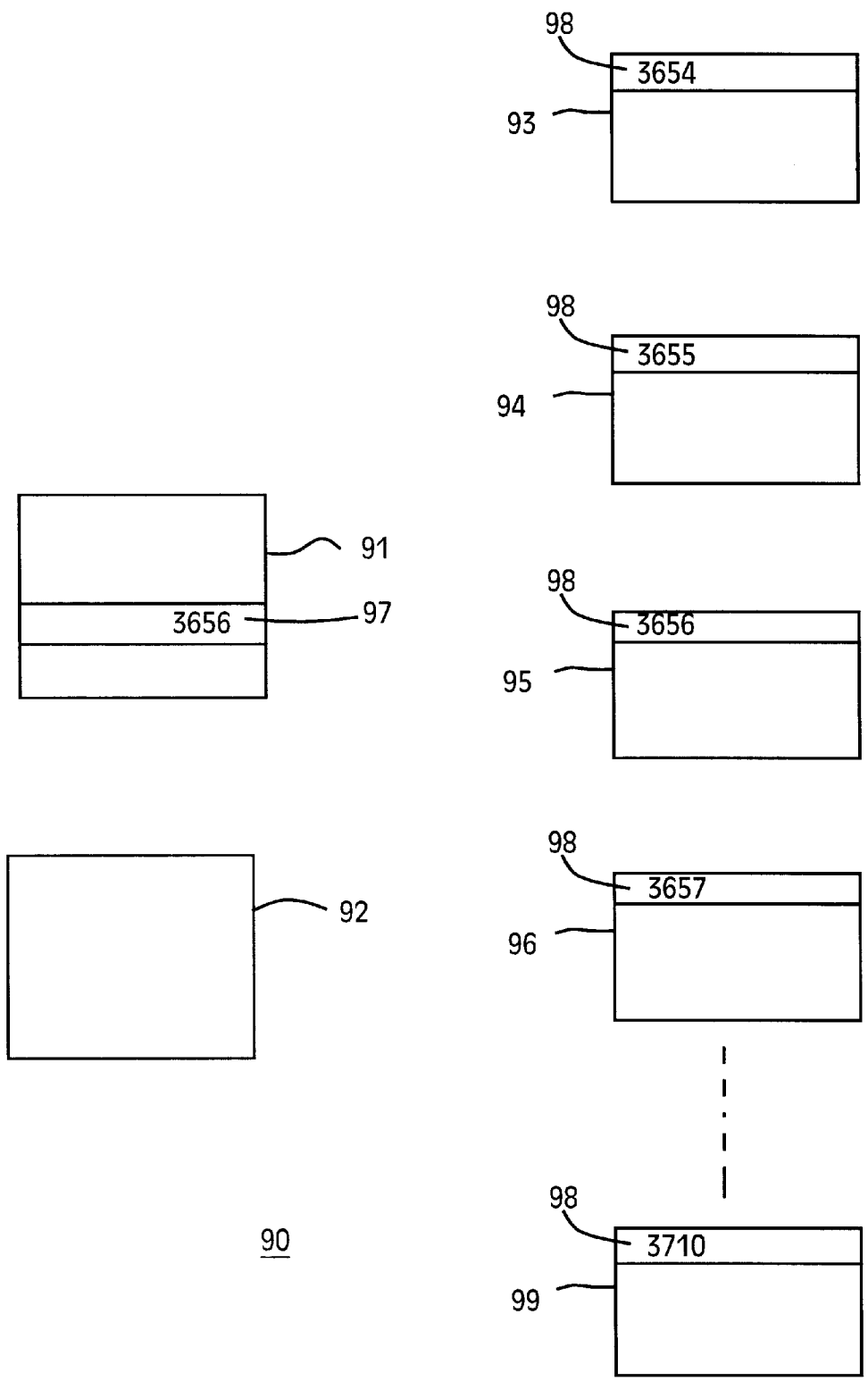
FIG. 9 is a diagram of records on the program card.

FIG. 9 shows a simplified, abstract, view of program card records 90. Records 90 include a field identifying card 82 as a program card. Records 90 include 57 coupon records having 57 contiguous coupon ID's, coupon ID's 3654–3710.

Header record 91 includes a coupon selection field 97 that stores a value indicating one of the coupon records. At the time depicted in FIG. 9, field 97 stores coupon ID 3656, corresponding to coupon record 95. In other words, at the time depicted in FIG. 9, coupon ID 3656 is selected.

ID record 92 includes other data, such as the effective date of the coupon offers stored on card 82.

Figure 10:
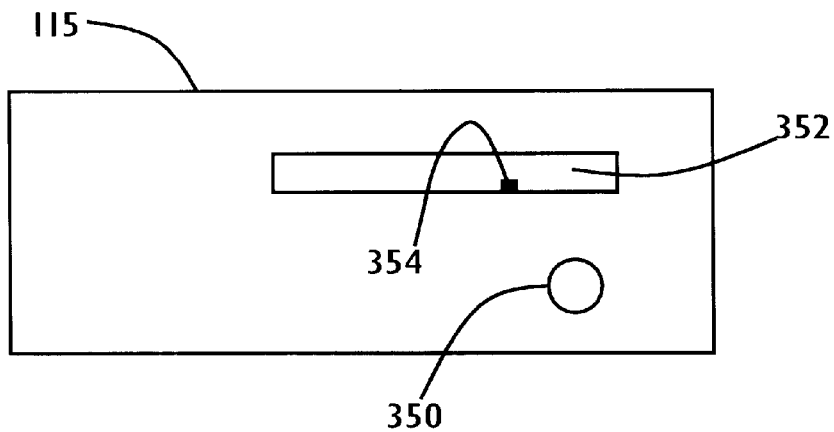
FIG. 10 is a diagram of a shelf unit shown in FIG. 4A.

FIG. 10 shows shelf unit 115, including interface slot 352 and light display 353, which can emit both a green light and a red light. Shelf unit 115 has no external wires connecting shelf unit 115 to another device. Interface slot 352 has a width sufficient to accommodate the width of program card 82. When a card is in interface slot 352, conductive contact 354 inside interface slot 352 touches contact 2427 on the card. Interface slot 352 has other contacts (not shown) for touching the other card contacts 2420.

Figure 11:
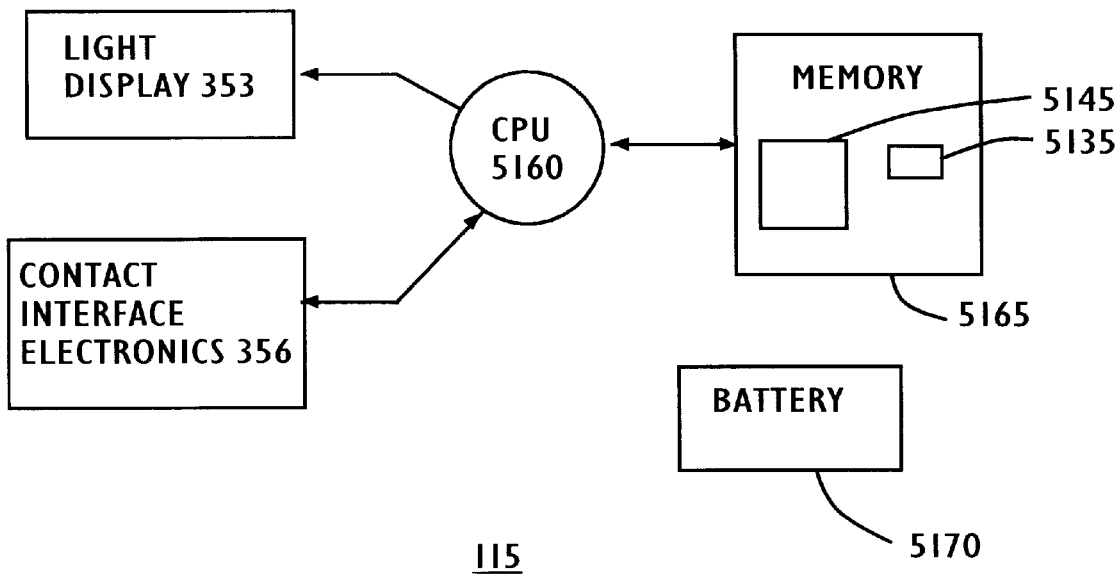
FIG. 11 is a block diagram of the shelf unit shown in FIG. 10.

FIG. 11 shows a block diagram of shelf unit 115, including central processing unit 5160, nonvolatile memory 5165, and battery 5170. Memory 5165 stores program 5145, executed by CPU 5160, and coupon ID 5135. Memory 5165 may include sections of ROM and EEPROM.

Figure 5A:
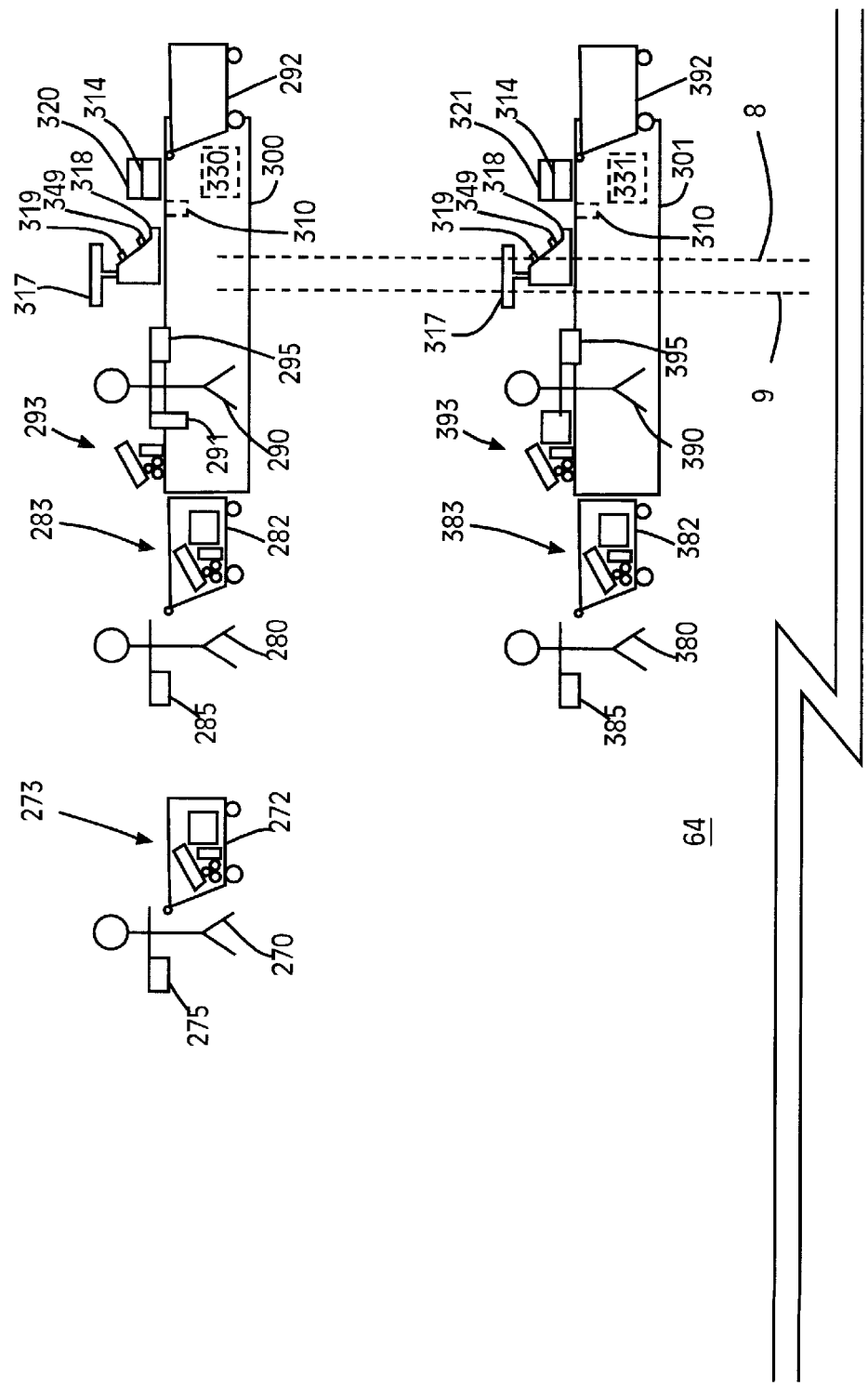
FIGS. 5A and 5B are the other type of view of another part of the first preferred retail store.
Figure 5B:
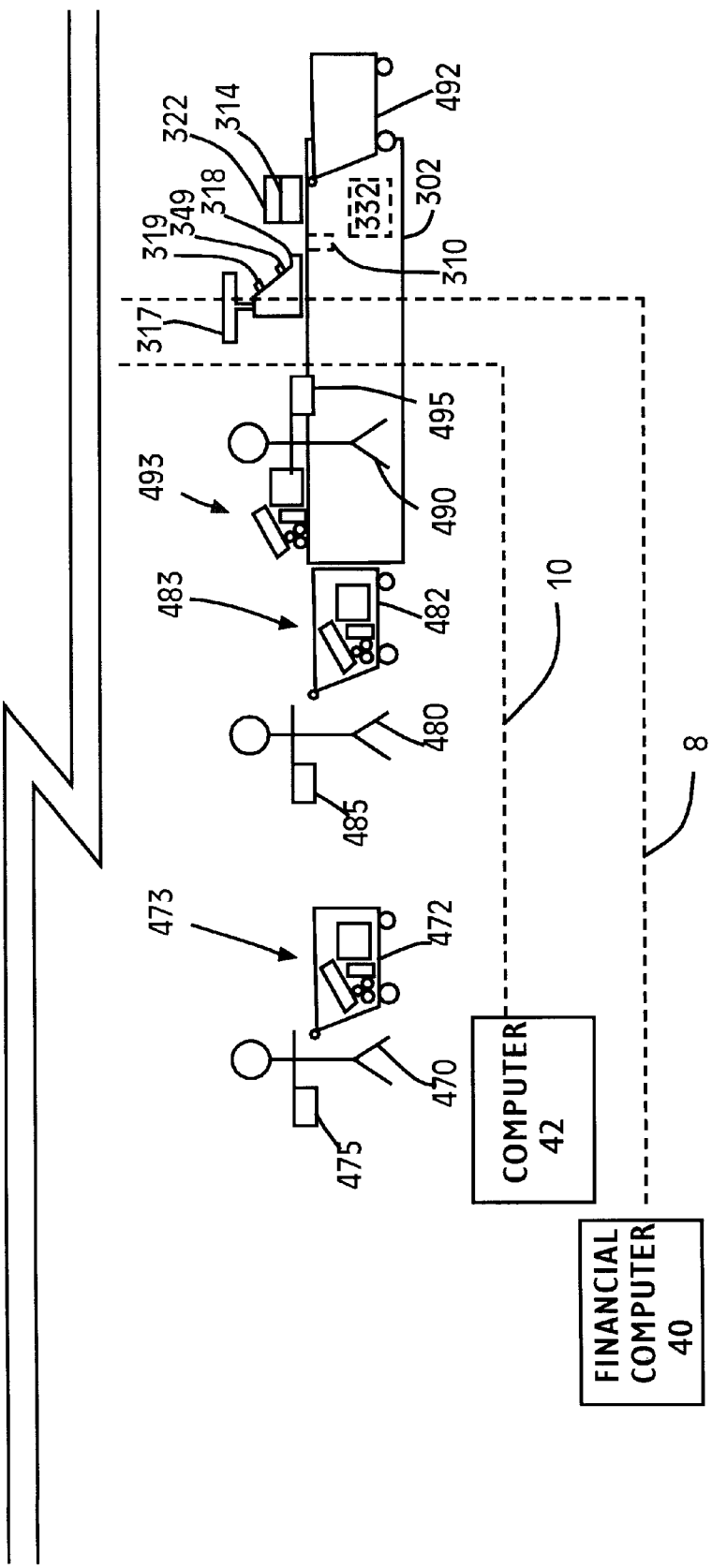

As shown in FIGS. 5A and 5B, each of checkout stations 300, 301, and 302 includes a UPC bar code reader that detects an optical (electromagnetic) signal reflected from a UPC symbol. Checkout station 300 includes card interface system 320 having a card interface slot 314, checkout station 301 includes card interface system 321 having a card interface slot 314, and checkout station 302 includes card interface system 322 having a card interface slot 314.

FIG. 12 is a simplified diagram of redemption control table 347 stored in card interface system 320. Each row in FIG. 12 represents an entry in table 347, and each of the 4 columns shown represents an entry field. A redemption control table may include additional entries for additional coupon offers, and additional fields for recording other types of information.

The first field in FIG. 12 is a coupon ID stored as 4 hexadecimal digits. The second field is a UPC product code corresponding to the coupon ID. The second field is stored as binary coded decimal. The third field is a reward type. A reward type of 2 represents a percent off coupon, and a reward type of 0 represents a cents off coupon.

The fourth field in FIG. 12 is the reward quantity.

The first entry shows a reward of 50 cents off because the reward type is 0. The second entry shows a reward quantity of 75 cents off because the reward type is 0. The third entry shows a reward quantity of 20 percent because the reward type field is 2.

Figure 13:
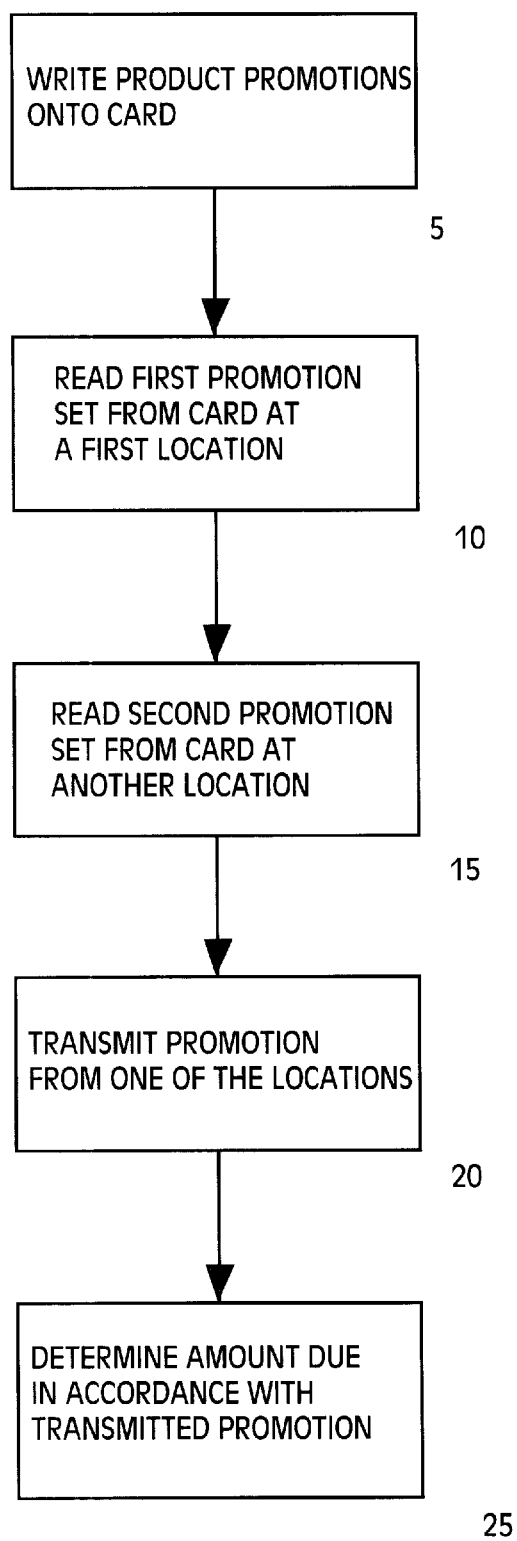
FIG. 13 is a flow chart of a process performed in the first preferred system.

FIG. 13 shows a processing performed in the first preferred embodiment of the present invention. Circuitry in promotion manager 50 writes a plurality of coupons onto a card, such as card 82. A coupon is one type of product promotion. (step 5).

The card is sent to a store, such as store 64.

A first card reader, such as shelf unit 115, reads an item corresponding to a first coupon set from card 82. The first coupon set consists of coupon 3656 for bottles of detergent 112. (step 10).

A second card reader, such as shelf unit 125, reads an item corresponding to a second coupon set from card 82. The second coupon set consists of coupon 3655 for boxes of old world pasta 122. (step 15).

Store clerk 19 also presents card 82 to card interface system 320, and card interface system 320 then reads items corresponding to a third coupon set from card 82 to build coupon redemption table 347. The third coupon set includes 57 coupons, coupons 3654, 3655, 3656, 3657, . . . 3710.

When a customer presents a customer card to a shelf unit, such as shelf unit 115, the shelf unit sends a coupon to the customer card. In other words, one of the shelf units essentially transmits a promotion to the customer. (step 20).

Subsequently, when the customer checks out of the store with a product corresponding to the coupon, a checkout station determines an amount due, by redeeming the coupon. (step 25).

Figure 14:
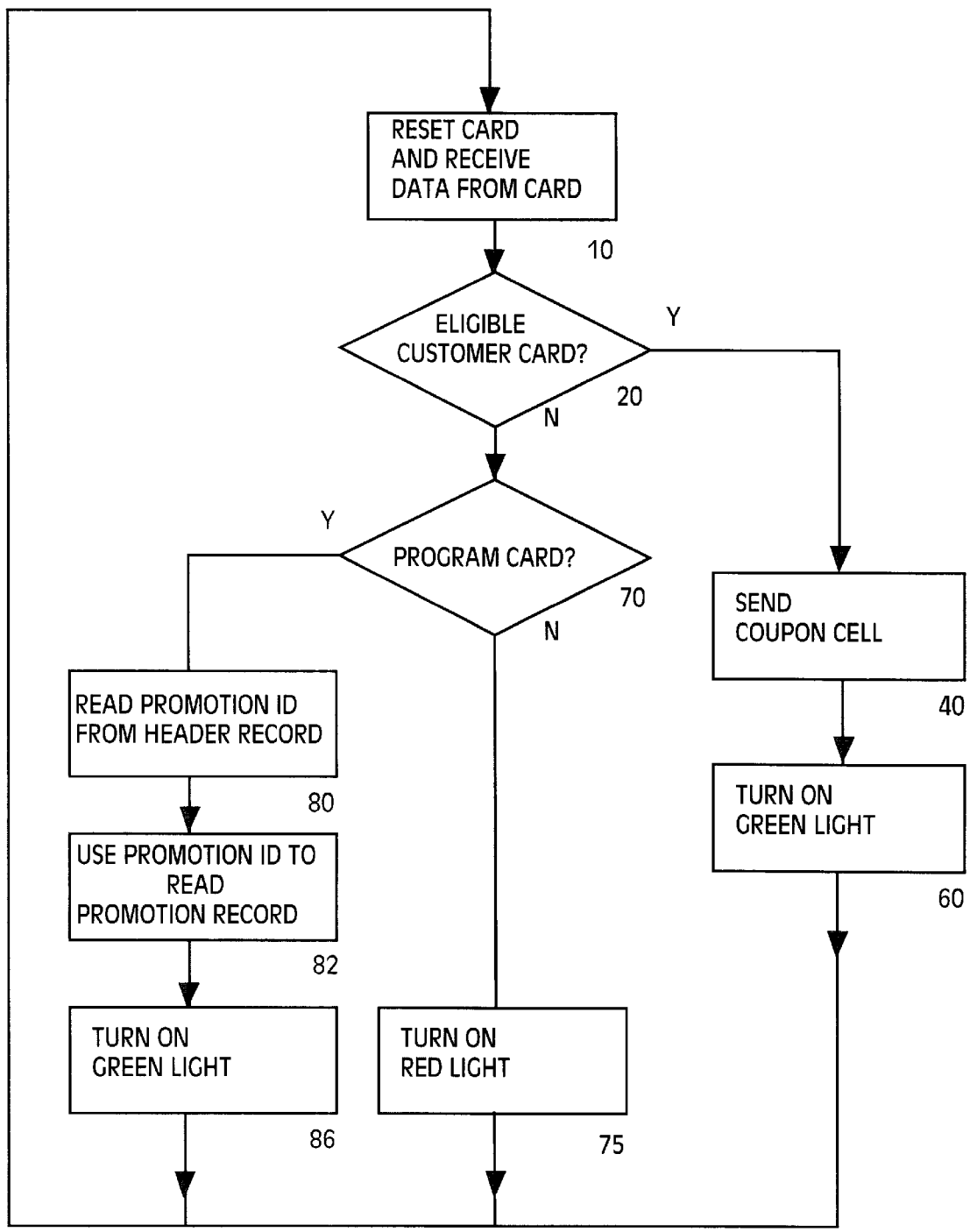
FIG. 14 is a flow chart of a process performed by the shelf units shown in FIG. 4A.

FIG. 14 shows an example of a processing for step 10, or step 15, of FIG. 13. FIG. 14 could represent a processing performed by processor 5160 and program 5145 in shelf unit 115, for example. When a person inserts a card into interface slot 352 a switch (not shown) in interface slot 352 alerts CPU 5160 that a card has been inserted into the slot. Subsequently, CPU 5160 causes contact interface electronics 356 to reset the card. CPU 5160 then receives a header record from the card (step 10).

CPU 5160 analyzes the received header record to determine whether the card is a customer card that is eligible to receive paperless coupons in store 64 (step 20). If the card is an eligible customer card, CPU 5160 sends to the customer card a record containing a coupon cell. The coupon cell includes a 2-byte coupon ID for the product currently being promoted by the shelf unit (bottles of delta detergent 112). (step 40)

The coupon cell also includes a 2-byte count of coupons dispensed from this shelf unit during the current promotion, as disclosed in more detail in copending U.S. patent application Ser. No. 09/301,748 of KEN R. POWELL, KEVIN W. HARTLEY, THOMAS M. HINTZ, ELEANOR B. MAXWELL, and COREY C. SNOOK for SYSTEM AND METHOD EMPLOYING PORTABLE CARDS TO MONITOR A COMMERCIAL SYSTEM, filed Apr. 29, 1999, the contents of which are herein incorporated by reference.

CPU 5160 then signals light display 353 to display green to indicate to the customer that an electronic coupon has successfully been transferred to her customer card (step 60), thereby allowing the customer to conveniently verify whether she is eligible for a discount before selecting the product.

If the card is not an eligible customer card but is instead a program card, such as card 82 (step 70), CPU 5160 reads the coupon selection field 97 of header record 91, and subsequently uses the value read from field 97 to access one of the coupon records. More specifically, to determine the record index of the coupon record indicated by field 97, CPU 5160 reads the first coupon record 93. CPU 5160 reads field 98 to determine the first coupon ID in the flight, and subtracts this first coupon ID from the coupon ID stored in field 97 to determine the record index for the coupon selected by field 97. CPU 5160 writes a field in the coupon record of the selected coupon to indicate that a shelf unit has been programmed with the coupon ID.

CPU 5160 sets the value of coupon ID 5135 equal to the value of the coupon identified by selection field 97. Thus, clerk 19 changes the electronic coupon dispensed by shelf unit 115. (steps 80 and 82). The processing of steps 80 and 82 may also write a count of coupons dispensed from this shelf unit, during the previous product promotion, to the program card.

CPU 5160 then signals light display 353 to display green. (step 86).

In summary, a coupon may be considered to be one type of product promotion. Promotion manager 50 writes a plurality of promotions onto a portable card, such as card 82. Promotion manager 50 is located outside of store 64.

Shelf unit 115 reads coupon 3656 from card 82, to subsequently dispense coupon 3656 (a first promotion set).

Card writer 17 writes coupon number 3655, for example, into field 97 on card 82. Subsequently, shelf unit 122 reads field 97, to subsequently dispense coupon 3655.

Checkout Processing in the First Preferred Embodiment

While shopping in store 64, each of customers 210, 220, 230, 240, 250, 270, 280, and 290 carries his or her respective customer card. Customer 210 carries card 215, customer 220 carries card 225, customer 230 carries card 235, customer 240 carries card 245, customer 250 carries card 255, customer 270 carries card 275, customer 280 carries card 285, and customer 290 carries card 295. Each customer tows a shopping cart to hold selected products. Customer 210 tows cart 212, customer 220 tows cart 222, customer 230 tow cart 232, customer 240 tows cart 242, customer 250 tows cart 252, customer 270 tows cart 272, customer 280 tows cart 282, and customer 290 tows cart 292. Each customer removes one or more desired products from a shelf and places the removed product into her cart.

Upon completion of shopping, each customer brings selected products from the shelves to checkout stations 300, 301, or 302.

Figure 15:
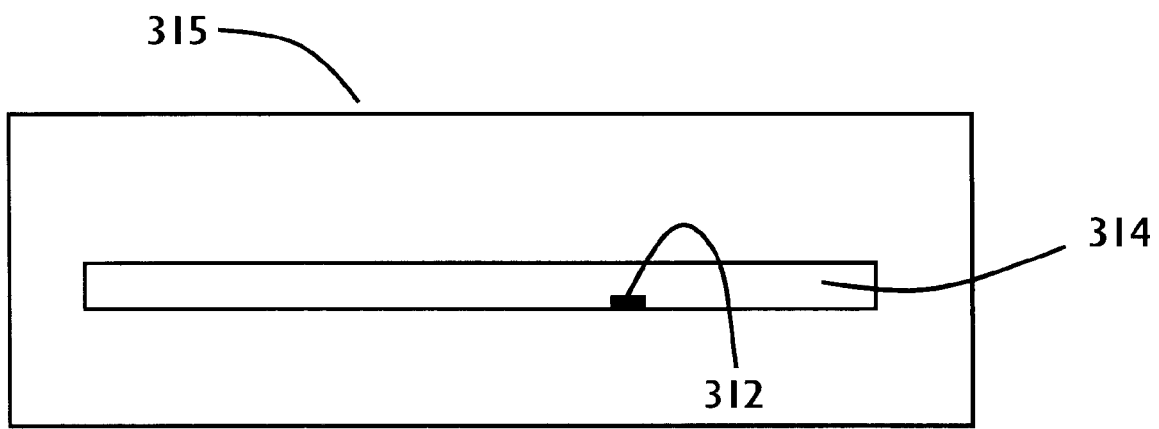
FIG. 15 is a drawing of a card interface shown in FIG. 5A.

FIG. 15 shows card reader/writer 315 including interface slot 314 having a width sufficient to accommodate the width of one of the customer cards. When a customer card is in interface slot 314, conductive contact 312 inside interface slot 314 touches contact 2427 on a customer card. Interface slot 314 has other contacts (not shown) for touching the other card contacts 2420, thereby applying power and a clock from the interface to the card.

Each customer redeems the electronic coupons by presenting her customer card, allowing the store clerk to insert the presented card into smart card reader/writer 315. For example, referring to FIGS. 4A, 4B, 5A, and 5B, a customer such as customer 290 completes the purchase of her selected products 293 by transferring products 293 from her cart 292 to station 300, and by presenting card 295 for insertion into card interface slot 314; customer 270 completes the purchase of her selected products 273 by transferring products 273 from her cart 272 to station 300, and by presenting card 275; customer 280 completes the purchase of her selected products 283 by transferring products 283 from her cart 282 to station 300, and by presenting card 285; customer 390 completes the purchase of her selected products 393 by transferring products 393 from her cart 392 to station 301, and by presenting card 395;customer 380 completes the purchase of his selected products 383 by transferring products 383 from his cart 382 to station 301, and by presenting card 385;customer 490 completes the purchase of his selected products 493 by transferring products 493 from his cart 492 to station 302, and by presenting card 495; customer 480 completes the purchase of his selected products 483 by transferring products 483 from his cart 482 to station 302, and by presenting card 485;customer 470 completes the purchase of his selected products 473 by transferring products 473 from his cart 472 to station 302, and by presenting card 475. Customer 210 (FIG. 4A) completes the purchase of her selected products 214 by transferring products 214 from her cart 212 to station 300, and by presenting card 215 for insertion into card interface slot 314. It is presently preferred that card presentation occur at the beginning of the checkout transaction, although card presentation could happen later. Card interface systems 320, 321, and 322 then read the coupon offers from the card.

A checkout clerk (not shown) scans each selected product past bar code reader 310, or enters the product selection information manually via keyboard 318.

A CPU and program in system 320 detect products selected by the customer. Detecting selected products, and sending discount information to a Point of Sale system, is a subject of copending application Ser. No. 09/301,749 of KEN R. POWELL, KEVIN W. HARTLEY, ELEANOR B. MAXWELL, and COREY C. SNOOK for COMPUTER SYSTEM CONFIGURATION AND METHOD FOR A STORE, filed Apr. 29, 1999, the contents of which are herein incorporated by reference.

The CPU and program in system 320 perform electronic coupon redemption, by processing the selected products in the context of the coupon information from the customer's card to determine discount eligibility.

At the conclusion of the transaction the shelf unit coupons on the card are voided and the clerk is notified to remove the customer's card from slot 314 and return it to the customer. Checkout station 300 determines a total amount due and prints the total amount due on display 317 and on the customer's paper receipt.

FIG. 16 shows a message 3002 sent by system 330 to financial computer 40, via network cable 8, in response to receiving a product signal from bar code reader 310. Message 3002 is a request for product information for the most recently scanned product 293.

FIG. 17 shows a message 3004 sent from financial computer 40 to system 330, via network cable 8. Financial computer 40 sends a message 3004 in response to receiving a message 3002.

After system 330 determines a basic price for the product by processing a message 3004, system 330 displays the description of the product and product price on display 317. Thus, system 330 acts to detect a product scanned by bar code reader 310 and determine a basic price for the product by sending a message 3002 to financial computer 40 and receiving a message 3004 from financial computer 40. System 330 scans and processes each product 293 in a similar manner.

System 330 processes discount signals sent by card interface system 320, to deduct discounts from the basic price and determine a total amount due. Sending discount signals to a cash register system is a subject of copending application Ser. No. 09/301,749 of KEN R. POWELL, KEVIN W. HARTLEY, ELEANOR B. MAXWELL, and COREY C. SNOOK for COMPUTER SYSTEM CONFIGURATION AND METHOD FOR A STORE, filed Apr. 29, 1999, the contents of which are herein incorporated by reference.

System 330 displays the total amount due on display 317.

The preferred system and method will now be described in more detail.

Figure 18:
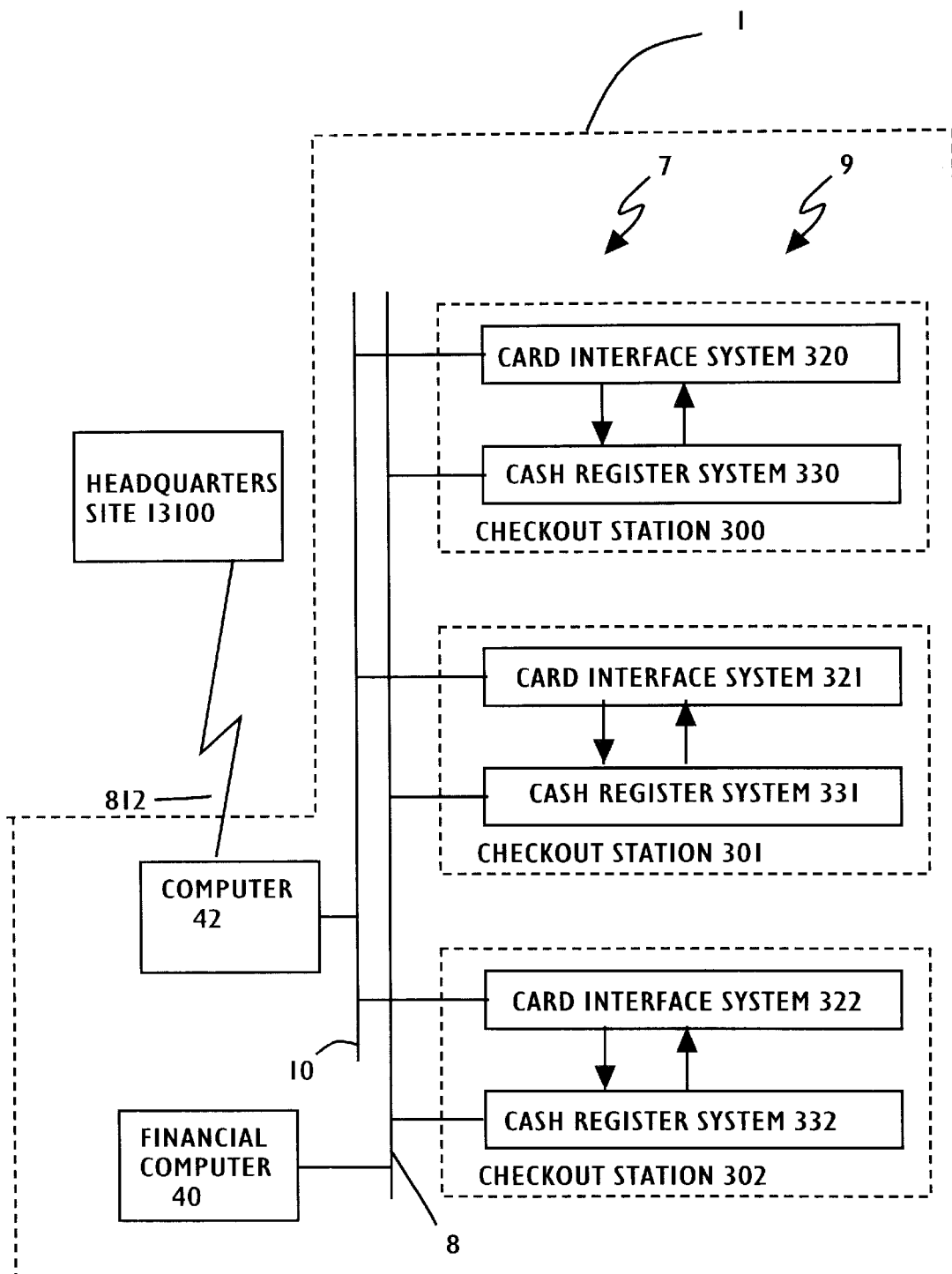
FIG. 18 is a block diagram of the first preferred computer system.

FIG. 18 shows another aspect of the first preferred system. Local Area Network (LAN) 7 includes ethernet cable 8 and 4 computers: financial computer 40, cash register system 330, cash register computer 331, and cash register computer 332. Cash register system 330 is in checkout station 300, cash register computer 331is in checkout station 301, and cash register computer 332 is in checkout station 302. Each of computers 40, 330, 331, and 332 has a respective network address uniquely identifying the computer in network 7. Each of computers 40, 330, 331, and 332 has a respective network interface card for recognizing when a packet containing the computer's address is sent over cable 8, temporarily storing such a packet, and alerting the computer's CPU when such a packet is recognized.

Computers 40, 330, 331, and 332 communicate by sending data packets in a format conforming to the communication protocol of network 7, meaning, for example, that the packet has a destination address field offset a certain number of bits from the start of the packet, and that the destination address field has a certain number of bits. Each packet is essentially a type of signal.

Local Area Network (LAN) 9 includes ethernet cable 10 and 4 computers: computer 42, card interface system 320, card interface system 321, and card interface system 322. Card interface system 320 is in checkout station 300, card interface 321 is in checkout station 301, and card interface system 322 is in checkout station 302. Each of computers 42, 320, 321, and 322 has a respective network address uniquely identifying the computer in network 9. Each of computers 42, 320, 321, and 322 has a respective network interface card for recognizing when a packet containing the computer's address is sent over cable 10, temporarily storing such a packet, and alerting the computer's CPU when such a packet is recognized.

Computers 42, 320, 321, and 322 communicate with each other by sending data packets in a format conforming to the communication protocol of network 9, meaning, for example, that the packet has a destination address field offset a certain number of bits from the start of the packet, and that the destination address field has a certain number of bits. Each packet is essentially a type of signal.

Figure 19:
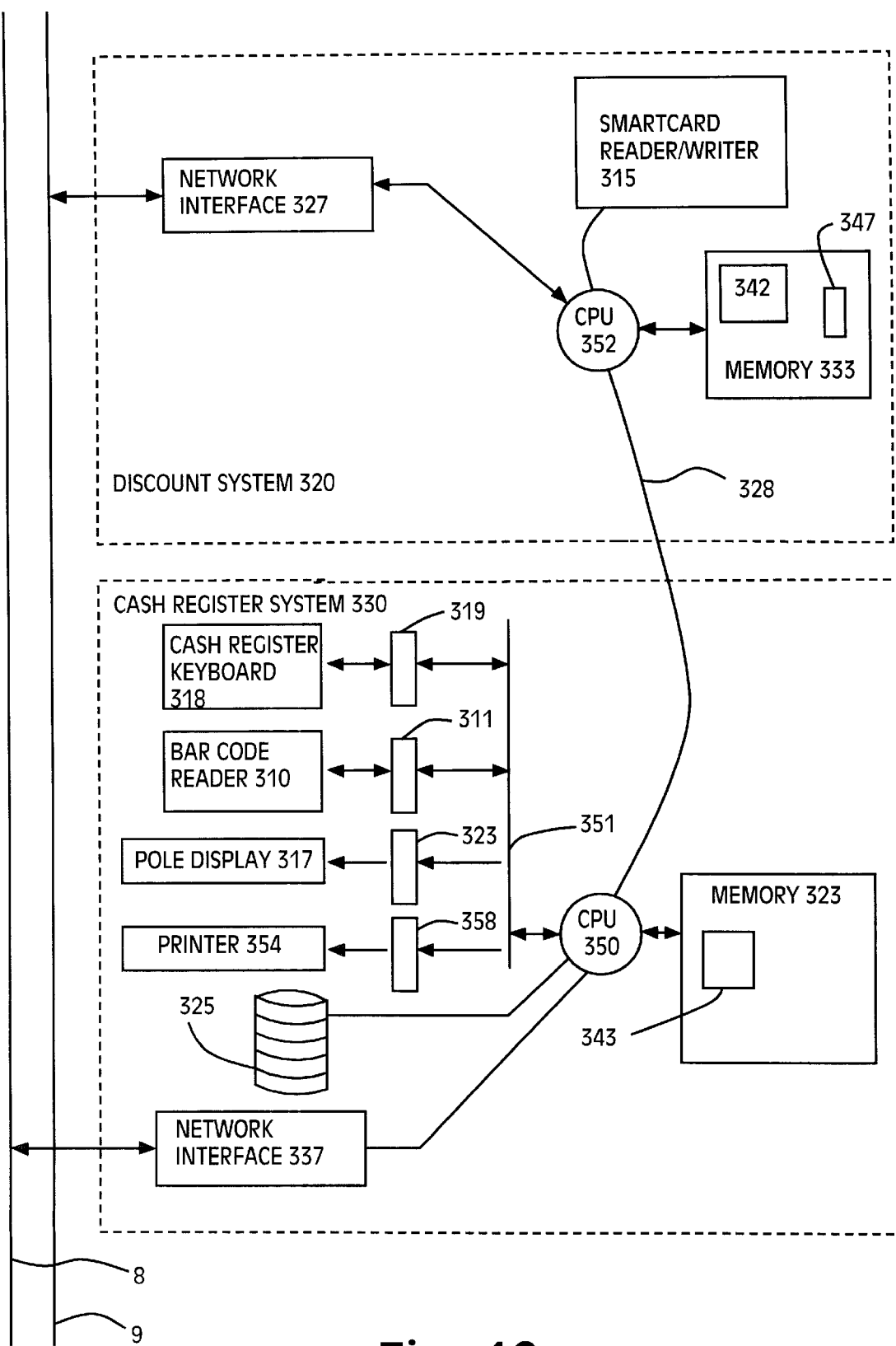
FIG. 19 is a block diagram of a check-out station shown in FIG. 5A.

FIG. 19 is a block diagram of checkout station 300 including cash register system 330 and card interface system 320. Cash register system 330 includes an IBM 4680-4690 Point of Sale (POS) System. Cash register keyboard 318 allows manual entry of alpha-numeric data. Disk 325 provides long term storage. Bar code reader 310 generates a bar code signal, and sends the bar code signal to CPU 350 via bus 351. Poll display 317 displays product data in response to signals from CPU 350. CPU 350 executes program 343 in random access, addressable memory 323.

If bar code reader 310 sends a bar code for a product to CPU 350, CPU 350 sends a message 3002 to financial computer 40 via network interface 337, and CPU 350 sends the product UPC code to CPU 352 in system 320 via RS232 line 328.

In card interface system 320, CPU 352 executes program 342 in memory 333. CPU 352 and program 342 act to receive electronic coupons from a customer card, via reader/writer 315. Memory 333 stores redemption control table 347, which enables CPU 352 to determine if a product has a corresponding electronic coupon offer.

Checkout stations 301 and 302 each have the same capabilities and hardware as checkout station 300, cash register systems 331 and 332 each have the same capabilities and hardware as cash register system 330, and card interface systems 321 and 322 each have the same capabilities and hardware as card interface system 320.

Each of customer cards 215, 235, 255, 245, 275, 285, 295, 385, 395, 475, 485, and 495 have the same hardware structure as card 82.

When a customer inserts a customer card into a coupon dispensing device, the customer card receives a coupon code for the product from the device and adds the code to a table.

FIG. 20 shows a simplified view of coupon table 8435, which is in a data structure within other data structures in an EEPROM in customer card 215. Each row in FIG. 20 represents a coupon cell, an entry in table 8435. Table 8435 has three entries, reflecting the fact that customer 210 has received three electronic coupons from shelf units in store 64. The entry having the coupon number 3655 corresponds to a coupon for purchase of a box of Old World Pasta 122. The entry having the coupon number 3654 corresponds to a coupon for purchase of a box of Lighthouse Light Bulbs 134. The entry having the number 3656 corresponds to a coupon for purchase of detergent bottles 112. Additional information about table 8435 may be found in copending application Ser. No. 09/301,748 of KEN R. POWELL, KEVIN W. HARTLEY, THOMAS M. HINTZ, ELEANOR B. MAXWELL, and COREY C. SNOOK for SYSTEM AND METHOD EMPLOYING PORTABLE CARDS TO MONITOR A COMMERCIAL SYSTEM, filed Apr. 29, 1999, the contents of which are herein incorporated by reference.

CPU 352 communicates with a card in interface slot 314 through smart card reader/writer 315. A switch (not shown) in interface slot 314 alerts reader/writer 315, which alerts CPU 352, that a card has been inserted into the slot. Subsequently, CPU 352 causes smart card reader/writer 315 to reset the card. CPU 352 reads table 8435 in EEPROM 8462 of the customer card, and temporarily stores table 8435 contents in memory 333. When CPU 352 receives a product UPC from CPU 350, CPU 352 adds the product to a basket list for the current customer. CPU 352 searches for the received product code in the UPC product code fields of redemption control table 347, which enables CPU 352 to determine if the product has a corresponding electronic coupon offer. If the product does have an electronic coupon offer, CPU 352 searches coupon table 8435 to confirm that the customer has the coupon on her card. If the customer has the coupon on her card and the qualifier conditions are satisfied, CPU 352 sends discount information to CPU 350 via RS232 line 328, causing CPU 350 to adjust the total amount due. More detail about redemption processing is disclosed in copending application Ser. No. 09/301,749 of KEN R. POWELL, KEVIN W. HARTLEY, ELEANOR B. MAXWELL, and COREY C. SNOOK for COMPUTER SYSTEM CONFIGURATION AND METHOD FOR A STORE, filed concurrently with the instant application, the contents of which are herein incorporated by reference.

Second Preferred Embodiment

FIGS. 21A, 21B, 22A and 22B are each a partial view of 64'. Customers 210, 220, 230, 240, 250, 270, 280, and 290, 380, 390, 470, 480, and 490 shop in store 64'. Store 64' has a plurality of product areas, each corresponding to a respective product. Product Area 110 has Delta brand detergent. Product Area 120 has Old World brand pasta. Product Area 130 has Lighthouse brand light bulbs.

Some of the product areas have a respective promotion display for displaying an electronic product discount. Product Area 110 has promotion display 116, product area 120 has promotion display 126, and product Area 130 has promotion display 136. Product area 110 has bottles of detergent 112 grouped together on multiple shelves. Bottles of detergent 112 are contiguously grouped, meaning that no other product is between any two bottles of detergent 112.

No other product is between promotion display 116 and bottles of detergent 112. Promotion display 116 is on a shelf under some of the bottles 112 and over some of the bottles 112. In other words, Promotion display 116 is adjacent to bottles 112 and supported by a shelf that is in vertical alignment with some of the bottles 112.

Figure 21A:
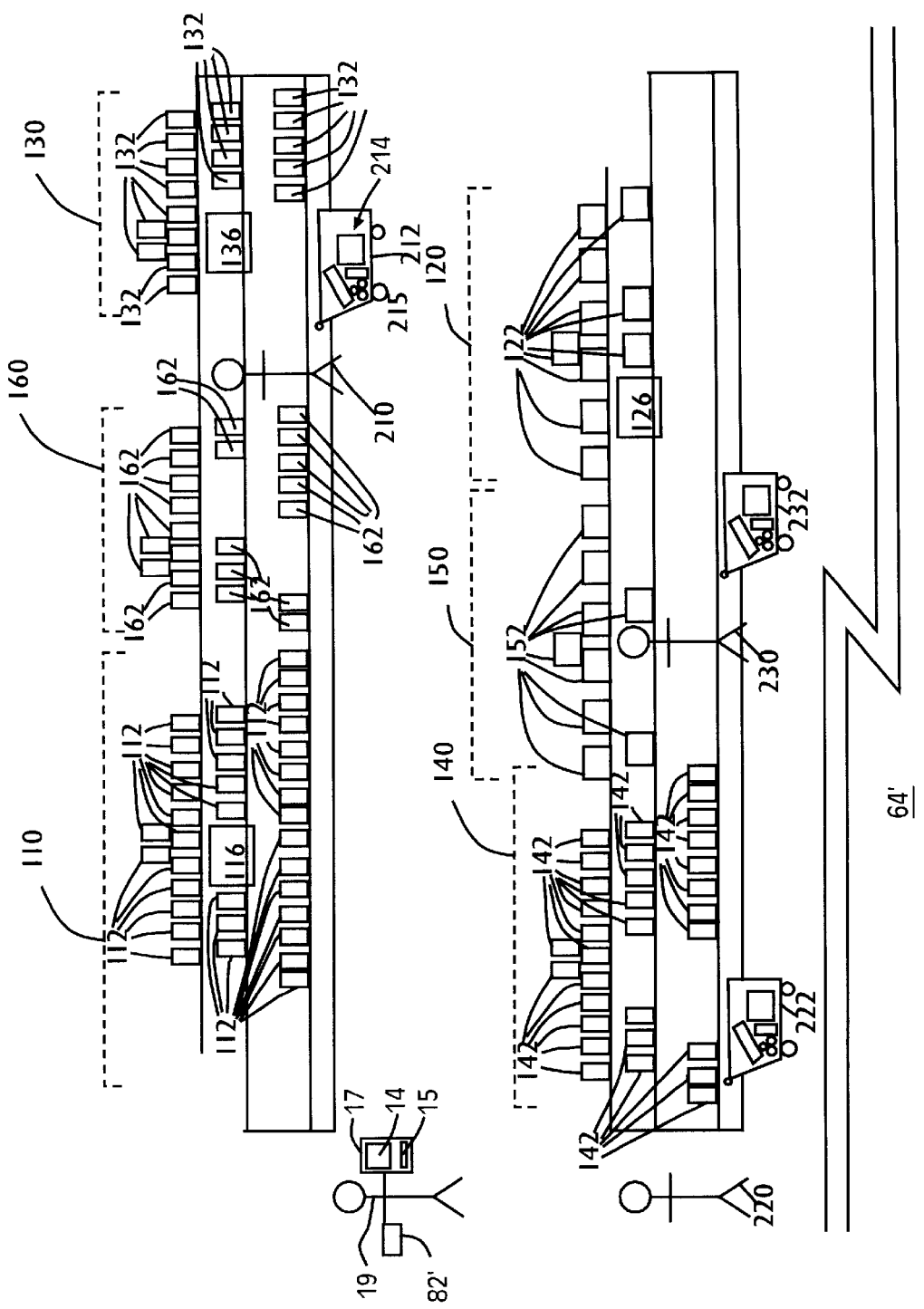
FIGS. 21A and 21B are a view of a part of the retail store in accordance with a second embodiment of the present invention.
Figure 21B:
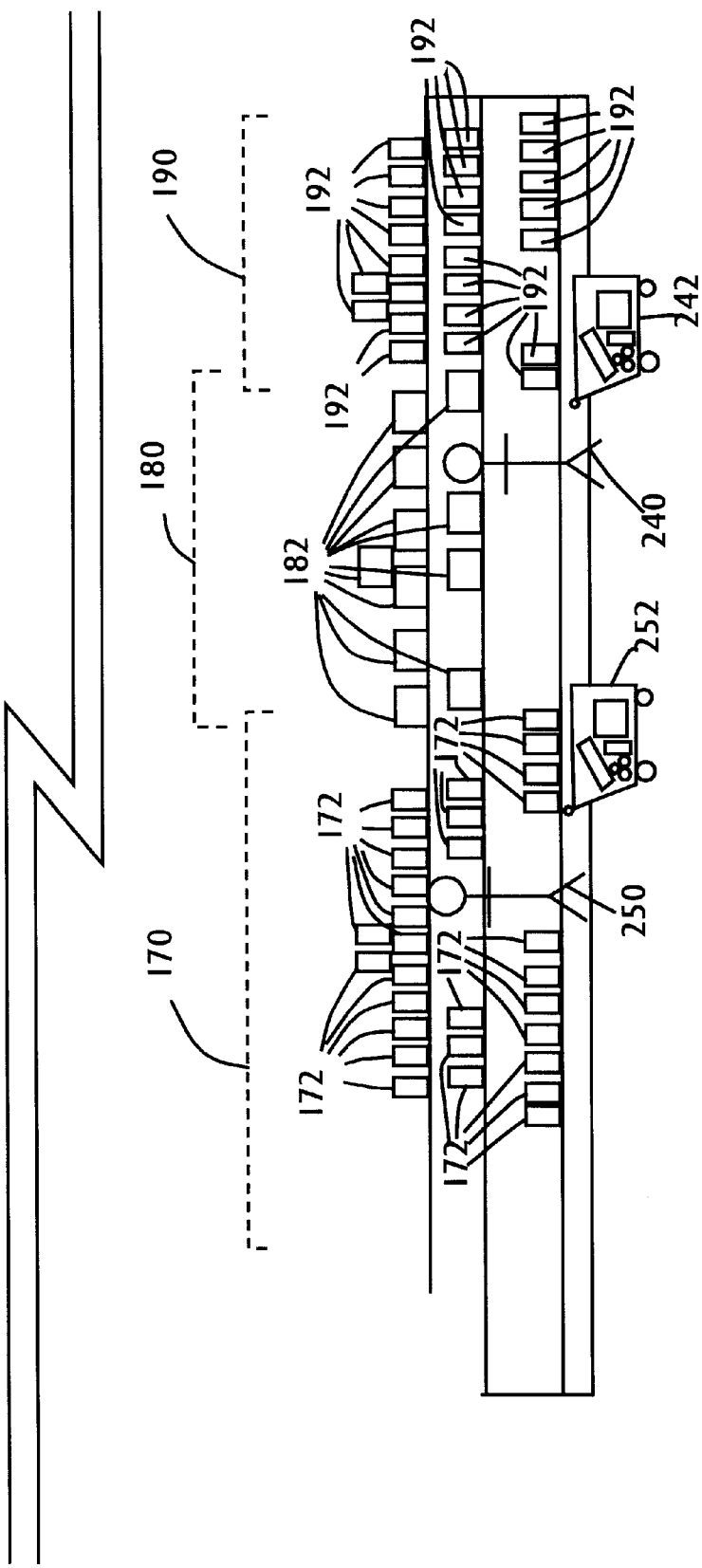
Figure 22B:
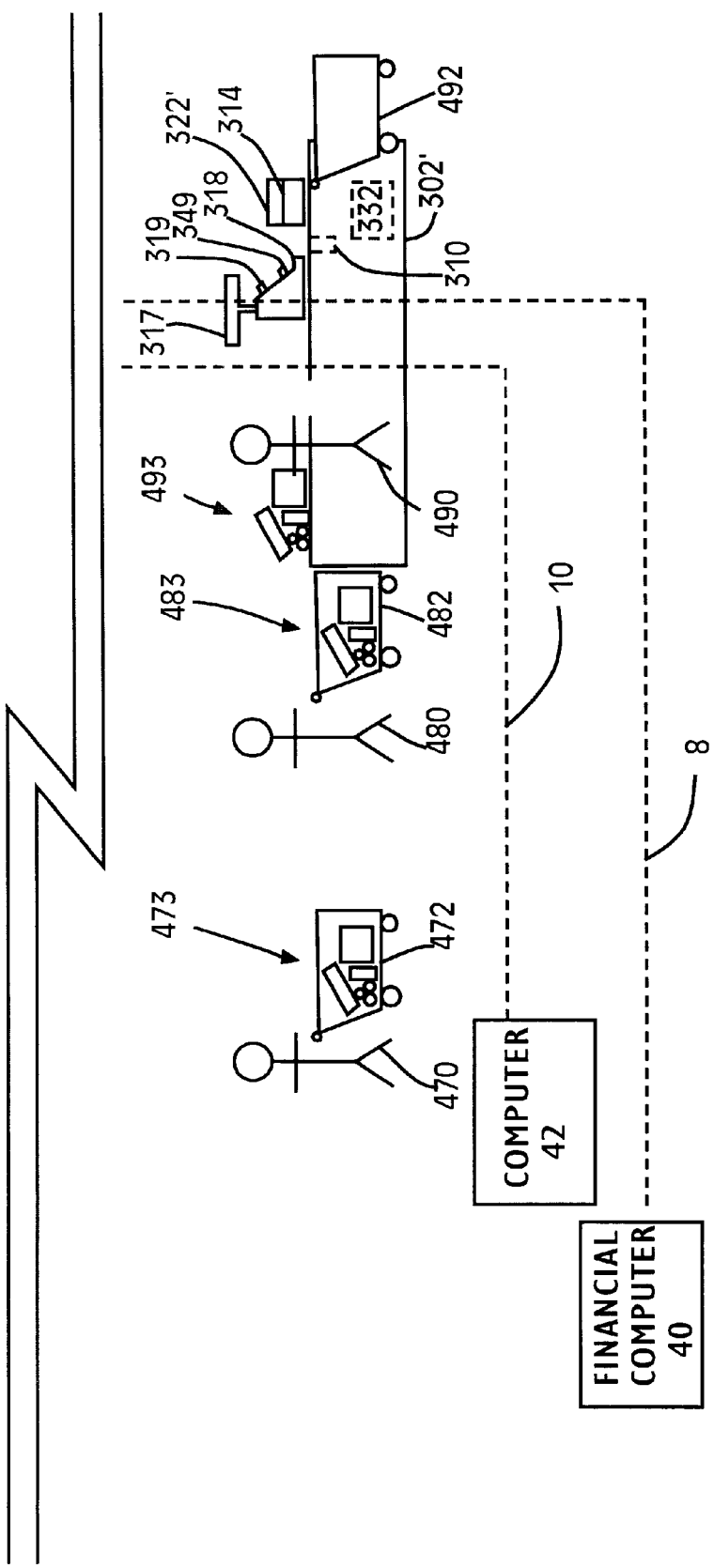

As shown in FIG. 21A, Store clerk 19 carries card 82' for reprogramming promotion displays 116, 126, and 136; and for reprogramming checkout stations 300', 301', and 302'. Store clerk 19 also carries card writer 17, which is a portable device having card interface slot 15 and keypad 14.

To reprogram a particular promotion display, clerk 19 inserts card 82' into interface slot 15 of card writer 17, and activates key pad 14 to cause card writer 17 to write promotion selection data onto card 82'. Subsequently, clerk 19 presents card 82' to a promotion display, allowing the promotion display to read and process the promotion identified by the promotion selection data, as described in more detail below.

To receive information about a product discount in store 64', a customer may read the promotion display adjacent to a product. The customer may then remove the product from the shelf and place the removed product into his cart.

Figure 23:
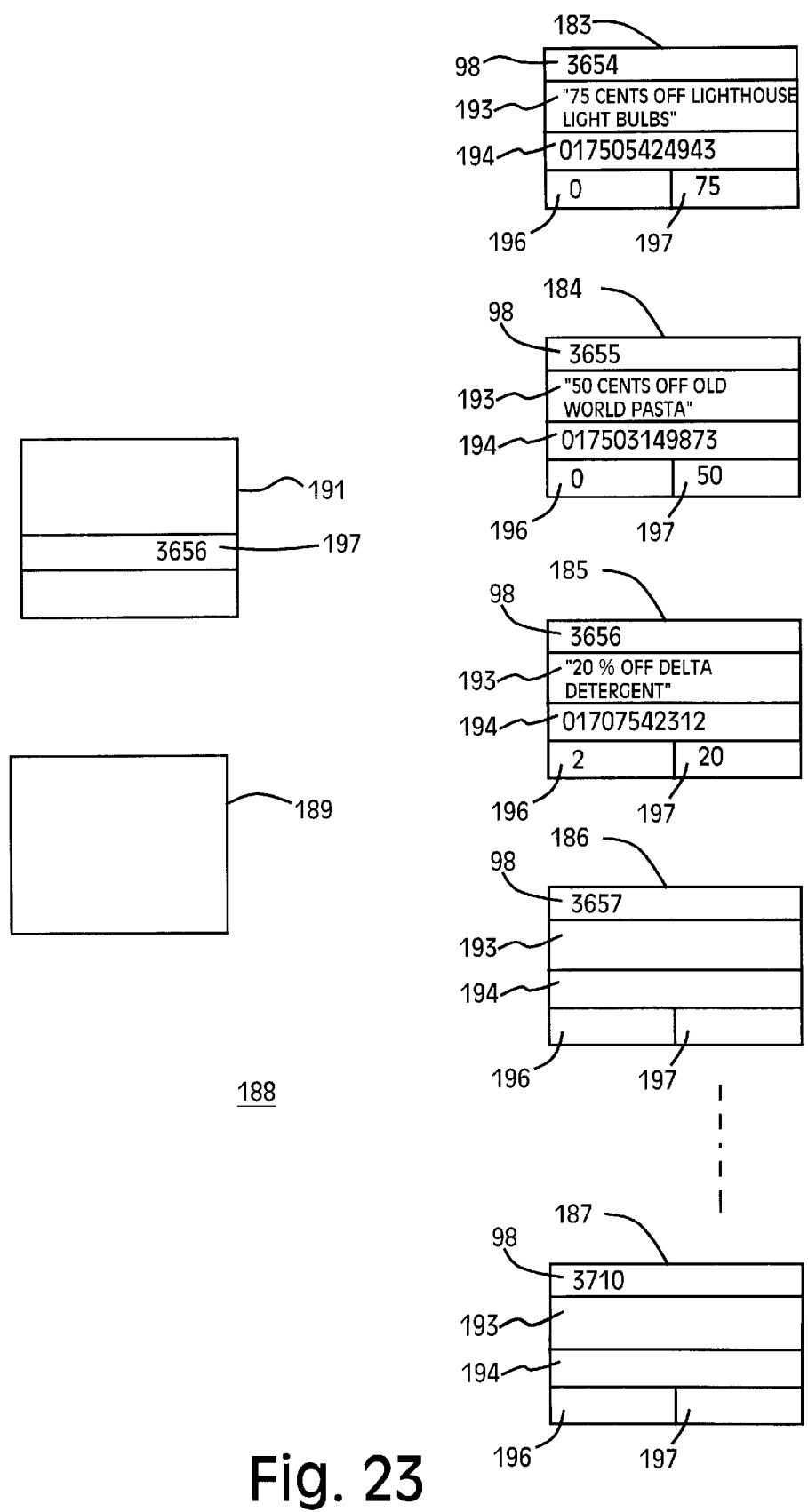
FIG. 23 is a diagram of records on a program card in accordance with the second embodiment.

FIG. 23 shows a simplified, abstract, view of records 188, written by promotion manager 50, onto an EEPROM in card 82'. Records 188 include a plurality of product promotions. When clerk 19 inserts program card 82' into a promotion display, the promotion display reads and processes the promotion identified by promotion selection data. The promotion selection data is written by card writer 14.

Header record 191 includes a promotion selection field 197 that stores a value indicating a product discount record. At the time depicted in FIG. 23, field 197 stores product discount ID 3656, corresponding to product discount record 185. In other words, at the time depicted in FIG. 24, product discount ID 3656 is selected.

ID record 189 includes other data, such as the effective date of the product discount offers stored on card 82'.

Each of the product discount records 183, 184, 185, 186, and 187 explicitly shown in FIG. 23 includes a text string field 193, a product UPC field 194, a discount type field 196, and a discount quantity field 197.

Figure 24:
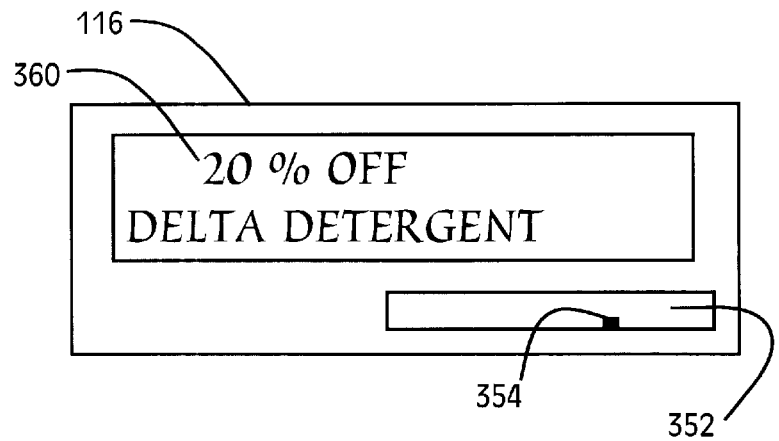
FIG. 24 is a diagram of a display device shown in FIG. 21A.

FIG. 24 shows promotion display 116, including liquid crystal display (LCD) 360, and interface slot 352. Promotion display 116 has no external wires connecting promotion display 116 to another device. When program card 82' is in interface slot 352, conductive contact 354 inside interface slot 352 touches contact 2427 on card 82'. Interface slot 352 has other contacts (not shown) for touching the other card contacts 2420.

Figure 25:
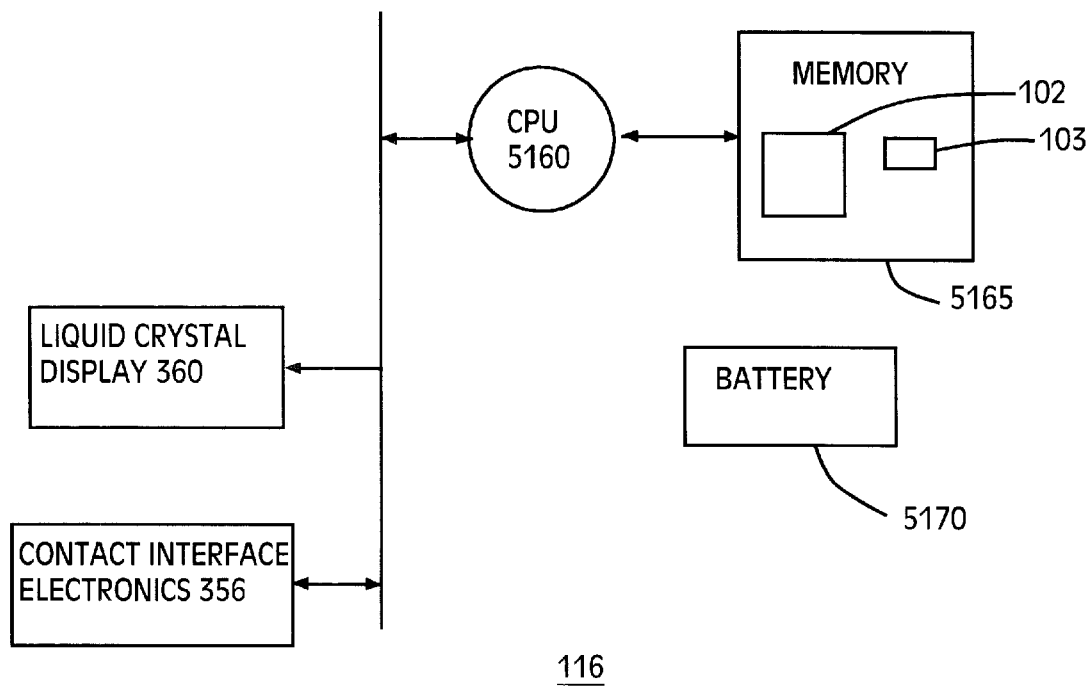
FIG. 25 is a block diagram of the display device shown in FIG. 24.

FIG. 25 shows a block diagram of promotion display 116, including central processing unit 5160, nonvolatile memory 5165, and battery 5170. Memory 5165 stores program 102, executed by CPU 5160, and text string 103.

Figure 26:
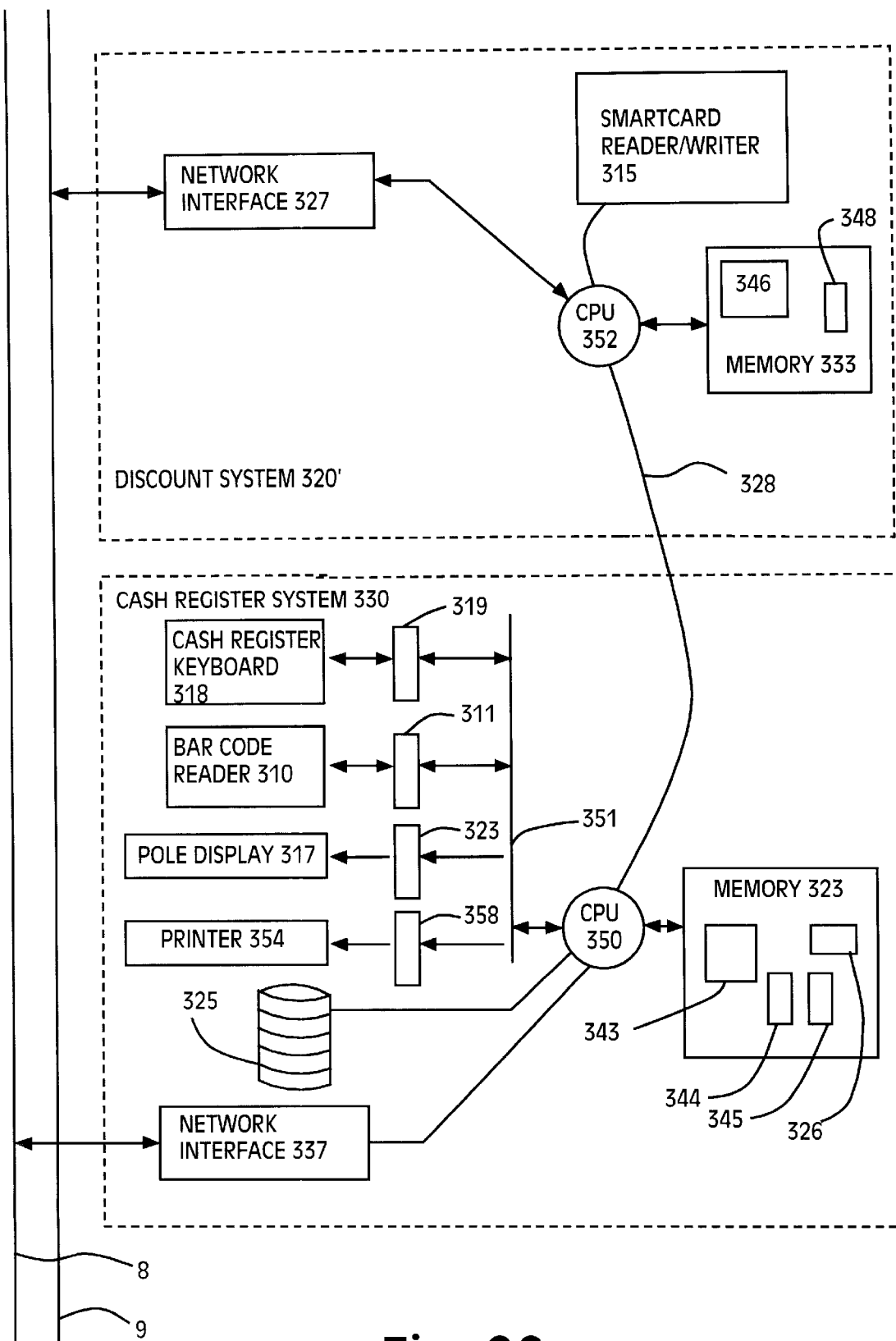
FIG. 26 is a block diagram of a check-out station shown in FIG. 22A.

FIG. 26 is a block diagram of checkout station 300'. In discount system 320', CPU 352 executes program 346 in memory 333. CPU 352 and program 346 act to determine if a product has a corresponding discount in discount control table 348.

FIG. 27 is a simplified diagram of discount control table 348. Each row in FIG. 27 represents an entry in table 348, and each of the 3 columns shown represents an entry field. The first field is a UPC product code. The first field is stored as binary coded decimal. The second field in FIG. 27 is a reward type. A reward type of 2 represents a percent off product discount, and a reward type of 0 represents a cents off product discount.

The third field in FIG. 27 is the reward quantity.

The first entry shows a reward of 50 cents off because the reward type is 0. The second entry shows a reward quantity of 75 cents off because the reward type is 0. The third entry shows a reward quantity of 20 percent because the reward type field is 2.

Figure 28:
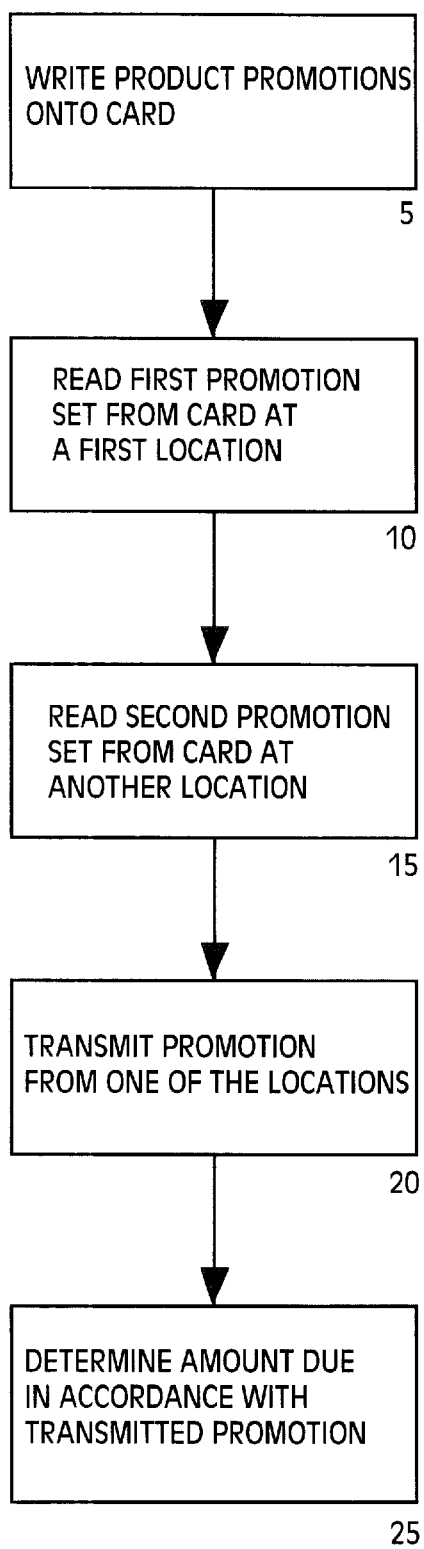
FIG. 28 is a flow chart of a process performed in the second preferred system.

FIG. 28 shows a processing performed in the second preferred embodiment of the present invention. Circuitry in promotion manager 50 writes a plurality of product promotions onto a card, such as card 82'. A displayed discount is one type of product promotion. (step 5).

The card is sent to a store, such as store 64'.

A first card reader, such as promotion display 116, reads an item corresponding to a first promotion set from card 82'. The first promotion set consists of a discount for bottles of detergent 112. (step 10).

A second card reader, such as promotion display 126 reads an item corresponding to a second promotion set from card 82'. The second promotion set consists of a discount for boxes of old world pasta 122. (step 15).

Store clerk 19 also presents card 82' to card interface system 320', and card interface system 329 then reads items corresponding to a third promotion set from card 82 to build discount control table 348. The third promotion set includes 57 promotions, promotions 3654, 3655, 3656, 3657, . . . 3710.

When a customer walks by a promotion display, such as promotion display 116, the customer may read the promotion displayed by the promotion display. In other words, one of the promotion displays essentially transmits a promotion to the customer. (step 20).

Subsequently, when the customer checks out of the store with a product corresponding to the promotion, a checkout station determines an amount due in accordance with the promotion. (step 25).

Figure 29:
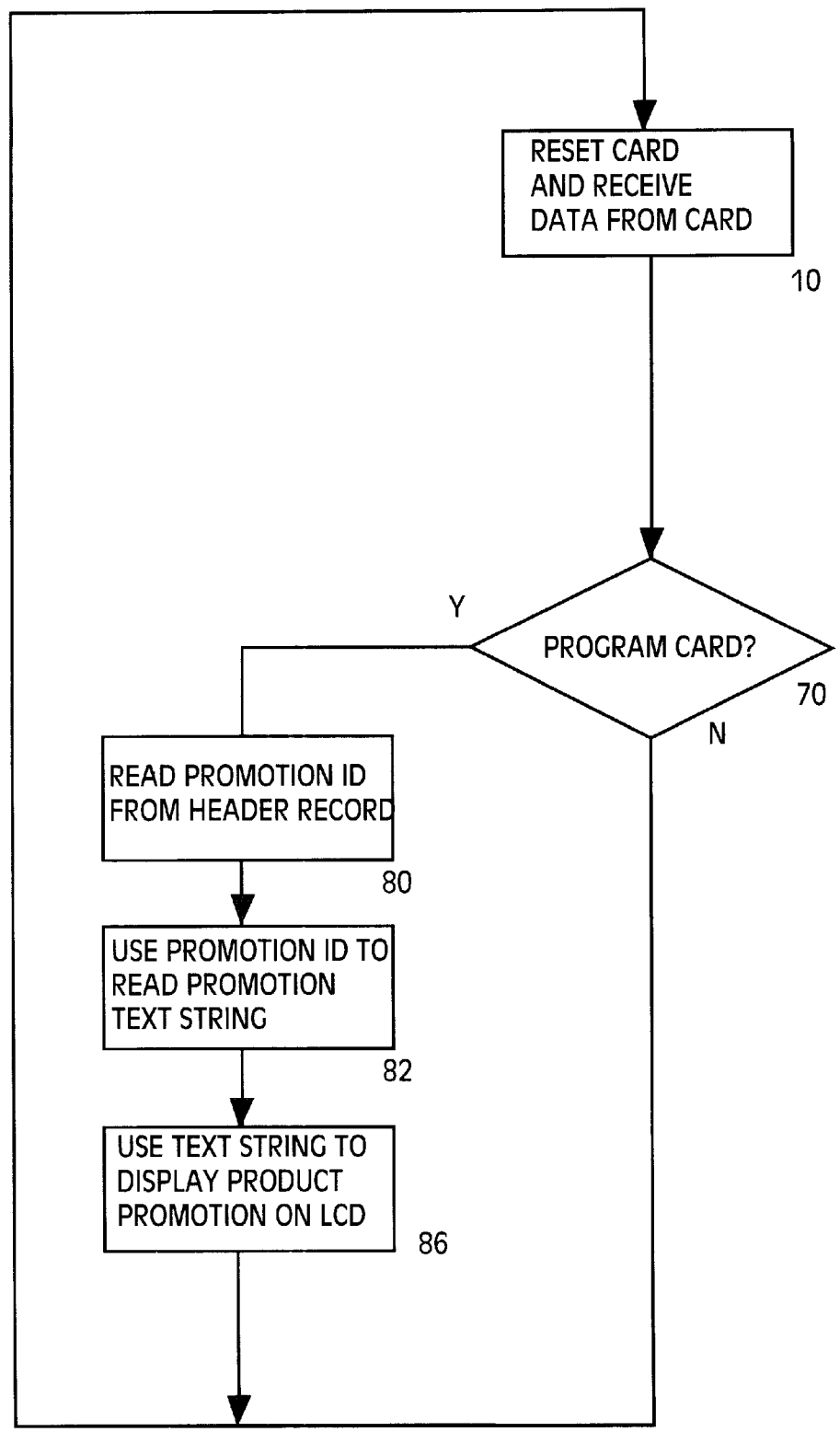
FIG. 29 is a flow chart of a process performed by the display devices shown in FIG. 21A.

FIG. 29 shows an example of a processing for step 10, or step 15, of FIG. 28. FIG. 29 could represent a processing performed by processor 5160 and program 102 in promotion display 116, for example. When store clerk 19 inserts card 82' into interface slot 352 a switch (not shown) in interface slot 352 alerts CPU 5160 that a card has been inserted into the slot. Subsequently, CPU 5160 causes contact interface electronic 356 to reset the card. CPU 5160 then receives a header record from the card (step 10). CPU 5160 analyzes the received header record to confirm that the card is a program card that is eligible to change the promotion message transmitted by display 116. (step 70). If the card is an eligible program card, such as card 82', CPU 5160 reads the product discount selection field 197 of header record 191, and subsequently uses the value read from field 197 to access one of the product discount records. (step 80)

CPU 5160 then writes the text in text string field 193, of the accessed product discount record, into text string buffer 103 in memory 5165. (step 82). Thus, clerk 19 changes the product promotion displayed by promotion display 116.

CPU 5160 uses the text string in buffer 103 to continually display a product promotion on LCD 360. (step 86).

Checkout Processing in the Second Preferred Embodiment

During a checkout transaction, if bar code reader 310 sends a bar code for a product to CPU 350, CPU 350 sends a message 3002 to financial computer 40 via network interface 337, and CPU 350 sends the product UPC code to CPU 352 in system 320 via RS232 line 328. When CPU 352 receives a product UPC from CPU 350, CPU 352 adds the product to a basket list for the current customer. CPU 352 compares the received product code to discounts in discount control table 348 using a process represented in FIG. 30.

Figure 30:
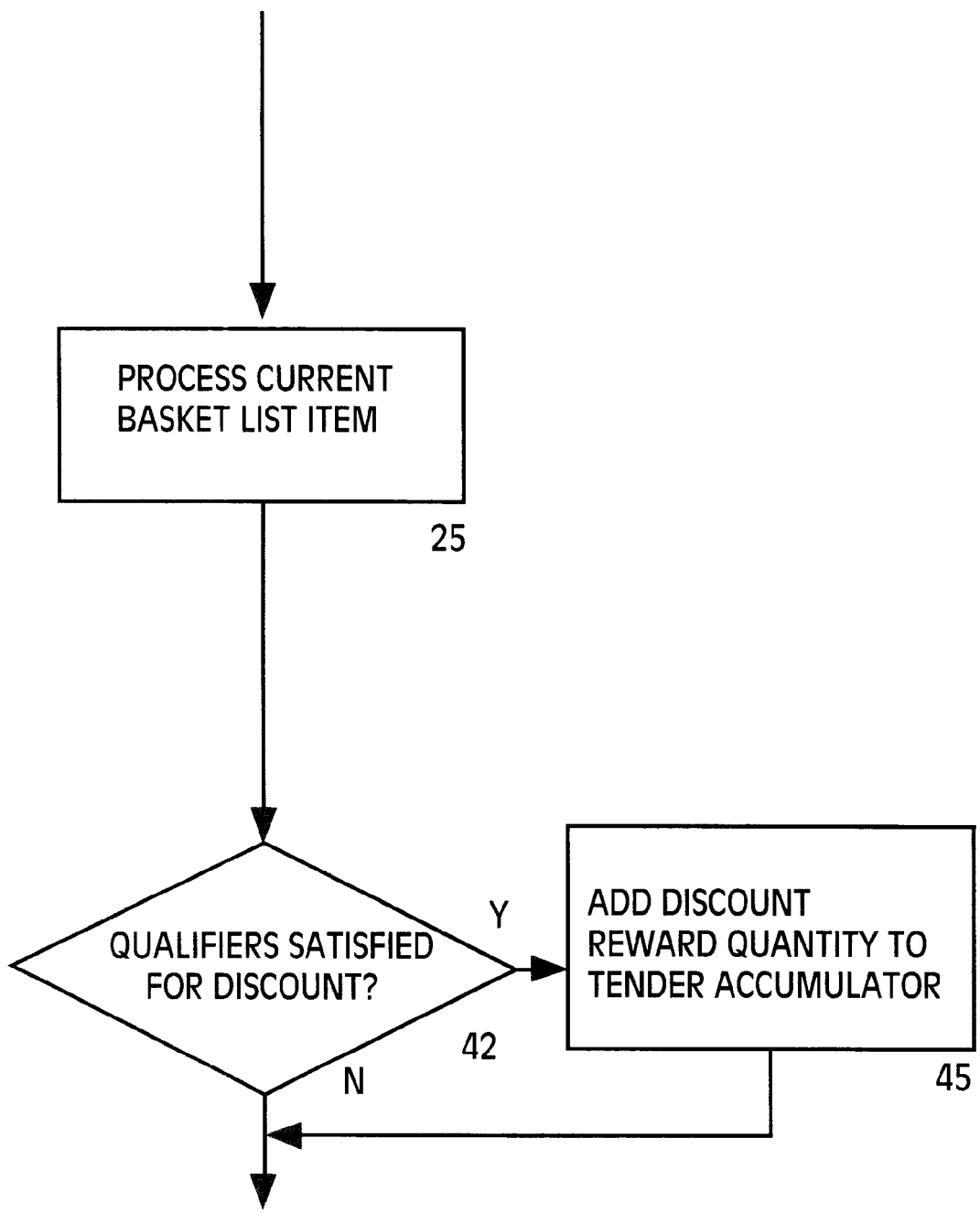
FIG. 30 is a flow chart of a process performed by a checkout station shown in FIG. 22A.

In FIG. 30, CPU 352 processes the current basket list product by searching discount control table 348 for an entry having a product code corresponding to the product code received from CPU 350. If the current basket list product is a product having a UPC product code matching the product code field in the discount control table 348, CPU 352 increments an accumulator for the entry in table 348, to record the quantity of the product. (step 25.) More specifically, if CPU 352 finds a match, CPU 352 increments an array element:

PRODUCT_COUNT [TABLE_348_INDEX]=PRODUCT_COUNT [TABLE_348_INDEX]+1, wherein PRODUCT_COUNT is an array and TABLE_348_INDEX is the index of the matching entry in table 348.

CPU 352 determines whether the qualifier conditions are satisfied for the matching entry in table 348. (step 42). If the qualifier conditions are satisfied, control passes to step 45. In step 45, if the promotion is a manufacturer promotion, the promotion quantity is added to a variable DISCOUNT_TENDER_PRETAX; otherwise if the promotion is a retailer promotion, the promotion quantity is added to a variable DISCOUNT_TENDER_POSTTAX.

CPU 352 sends discount information to CPU 350, in the form of messages reflecting the values of DISCOUNT_TENDER_PRETAX and DISCOUNT_TENDER_POSTTAX.

In other words, promotion display 116 acts to read from card 82 at a first location in the store, to display text from field 193 of record 95 (a first promotion set). Promotion display 136 acts to read from card 82' at a second location in the store, to display text from field 193 of record 93 (a second promotion set).

In summary, discount system 320' acts to read from card 82', to access all 57 product discount records, including records 93, 94, 95, and 96. Discount system 320' uses the accessed discount records to build discount control table 348. Cash register system 330 cooperates with the discount system 320' to determine an amount due in accordance with table 348 and a product selected by a customer in the store. Because both table 348 and the messages displayed by the promotion displays derived from a common card 82', table 348 corresponds to promotion messages readable by customers in the store.

Conclusion

Of course the invention is not limited to the embodiments illustrated above. For example, embodiments of the invention may be practiced with a single CPU having coupon, or other discount, processing integrated with conventional UPC product scanning and price lookup. Further, embodiments of the invention may be practiced without programming the checkout system with a card.

Although the second embodiment of the invention shows a multi-item promotion having each item stored on a common record, items related to the same promotion need not reside on the same record. Further, a promotion may have only a single item, such as a promotion number.

Although embodiments of the invention show a product selection signal written by a card writer responsive to a keyboard on the card writer, the card writing could instead be responsive to a bar code reader for reading a bar code from printed promotional materials. Further, although embodiments of the invention show a product selection signal written to the program card in the store, the invention may be practiced without writing to the program card in the store. For example, a promotion display device may select a particular product promotion depending on the serial number of the device, or depending on some other data external to the card.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims.

What is claimed is:

1. A method for a store and a portable card for storing a plurality of promotions, the method comprising:

reading from the card at a first location in the store, to a first promotion set, stored on the card, to a plurality of customers; and reading from the card at a second location in the store, to process a signal corresponding to a second promotion set stored on the card.

2. The method of claim 1 further including writing the plurality of promotions onto the portable card, from a location outside of the store.

3. The method of claim 1 further including the following step, performed between the two reading steps of writing a signal to the card, and wherein the second reading step includes reading the signal to determine the second promotion set.

4. The method of claim 1 wherein the system includes a card writer that is portable, and the method further includes the following step, performed between the two reading steps of writing a signal to the card using the card writer, and wherein the second reading step includes reading the signal to determine the second promotion set.

5. The method of claim 1 wherein the first reading step is performed by a first promotion transmitter and the second reading step is performed by a second promotion transmitter.

6. The method of claim 5 wherein the first promotion transmitter includes a first coupon dispenser and the second promotion transmitter includes a second coupon dispenser.

7. The method of claim 5 wherein the first promotion transmitter includes a first output device and the second promotion transmitter includes a second output device.

8. The method of claim 7 wherein the first output device includes a first visual display and the second output device includes a second visual display.

9. The method of claim 1 wherein the first reading step is performed by a promotion transmitter and the second reading step is performed by a system that determines an amount due.

10. A method for a store and a portable card for storing a plurality of coupons, the method comprising the steps, performed in the store, of:

reading from the card at a first location in the store, to process a signal corresponding to a first coupon stored on the card;

reading from the card at a second location in the store, to process a signal corresponding to a second coupon stored on the card;

reading from the card at a third location in the store, to process the first and second coupons stored on the card; and determining an amount due in accordance with a coupon received by a customer in the store and a product selected by the customer.

11. A method for a store and a portable card for storing a plurality of coupons, the method comprising the steps, performed in the store, of:

reading from the card at a first location in the store, to display a signal corresponding to a first product promotion stored on the card;

reading from the card at a second location in the store, to display a signal corresponding to a second product promotion stored on the card;

reading from the card at a third location in the store, to process the first and second product promotions stored on the card; and determining an amount due in accordance with a product promotion readable by a customer in the store and a product selected by the customer.

12. A system for a store and a portable card for storing a plurality of promotions, the system comprising:

a first receiver that receives signals from the card, to process a signal corresponding to a first promotion set stored on the card;

a second receiver that receives signals from the card, to process a signal corresponding to a second promotion set stored on the card.

13. The system of claim 12 further including a writer that writes the plurality of promotions onto the portable card, the writer being located outside of the store.

14. The system of 12 further including a writer that writes a signal to the card, and wherein the second receiver reads the signal to determine the second promotion set.

15. The system of 12 further including a hand-held card writer for writing a signal to the card and wherein the second receiver reads the signal to determine the second promotion set.

16. The system of claim 12 wherein the first receiver includes a promotion transmitter.

17. The system of claim 16 wherein the promotion transmitter includes a coupon dispenser.

18. The system of claim 16 wherein the promotion transmitter includes an output device.

19. The system of claim 18 wherein the output device includes a visual display.

20. The system of claim 12 wherein the first receiver includes a promotion transmitter and the second receiver includes a system that determines an amount due.

21. A system for a store and a portable card for storing a plurality of coupons, the system comprising:

a first receiver that receives signals from the card, to process a signal corresponding to a first coupon stored on the card;

a second receiver that receives signals from the card, to process a signal corresponding to a second coupon stored on the card;

a third receiver that receives signals from the card, to process the first and second coupons stored on the card; and a processor that determines an amount due in accordance with a coupon received by a customer in the store and the product selected by the customer.

22. A system for a store and a portable card for storing a plurality of coupons, the system comprising:

a first receiver that receives signals from the card, to display a signal corresponding to a first product promotion stored on the card;

a second receiver that receives signals from the card, to display a signal corresponding to a second product promotion stored on the card;

a third receiver that receives signals from the card, to process the first and second product promotions stored on the card; and a processor that determines an amount due in accordance with a product promotion readable by a customer in the store and a product selected by the customer.

23. A method of operating with a system including a portable card, a card writer, and a store including a plurality of shelves each having a respective interface supported by the shelf, the method comprising:

writing a plurality of first signals onto the card, each first signal corresponding to a promotion for a product in the store, and the steps, performed for each interface, of:

writing a second signal onto the card using the card writer;

moving the card to the interface;

receiving, in the interface, the second signal from the card; and processing, in the interface, a selected first signal from the card, the selected first signal being determined by the second signal.

24. The method of claim 23 wherein the selected first signal corresponds to price information for a product represented by the units adjacent to the interface and wherein processing includes transmitting the first signal.

25. The method of claim 23 wherein the system further includes a plurality of portable cards, and transmitting includes sending the selected first signal to a card presented by a customer.

26. The method of claim 23 wherein transmitting includes displaying the first signal.

27. The method of claim 23 wherein the system further includes a plurality of portable cards, and wherein processing includes recording the selected first signal, in the interface, the selected first signal corresponding to price information for a product represented by product units adjacent to the interface;

detecting, in the interface, the presence of a first card in the plurality of portable cards;

sending, responsive to the detecting step, the recorded first signal to the first card.

* * * * *